United States Patent
Livolsi

(10) Patent No.: US 10,691,158 B2
(45) Date of Patent: Jun. 23, 2020

(54) LOCKING KNOB

(71) Applicant: Anthony Livolsi, Oswego, NY (US)

(72) Inventor: Anthony Livolsi, Oswego, NY (US)

(*) Notice: Subject to any disclaimer, the term of this patent is extended or adjusted under 35 U.S.C. 154(b) by 0 days.

(21) Appl. No.: 16/050,719

(22) Filed: Jul. 31, 2018

(65) Prior Publication Data

US 2019/0041893 A1 Feb. 7, 2019

Related U.S. Application Data

(60) Provisional application No. 62/539,875, filed on Aug. 1, 2017.

(51) Int. Cl.
| | |
|---|---|
| *G05G 1/08* | (2006.01) |
| *G01D 5/16* | (2006.01) |
| *G05G 5/06* | (2006.01) |
| *G05G 1/12* | (2006.01) |
| *G05G 5/00* | (2006.01) |
| *G01D 5/165* | (2006.01) |

(52) U.S. Cl.
CPC ............ *G05G 1/082* (2013.01); *G01D 5/165* (2013.01); *G05G 5/06* (2013.01); *G05G 1/12* (2013.01); *G05G 5/005* (2013.01)

(58) Field of Classification Search
CPC .......... G05G 1/12; G05G 1/082; G01D 5/165; Y10T 74/2084
See application file for complete search history.

(56) References Cited

U.S. PATENT DOCUMENTS

| | | | |
|---|---|---|---|
| 2,509,058 A | 5/1950 | Haury | |
| 2,660,904 A | 12/1953 | Hilsinger, Jr. | |
| 2,742,127 A | 4/1956 | Mumford et al. | |
| 2,780,333 A | 2/1957 | Hyman Reiser et al. | |
| 2,797,591 A * | 7/1957 | Marrapese | G05G 1/02 74/528 |
| 2,797,592 A | 7/1957 | Marrapese | |
| 2,899,841 A * | 8/1959 | Melloy | G05G 1/12 74/548 |
| 2,935,896 A * | 5/1960 | Simon | G05G 1/12 74/553 |
| 3,100,404 A | 8/1963 | Boeddeker et al. | |
| 3,187,287 A | 6/1965 | Weidenman | |
| 3,198,923 A | 8/1965 | Tripp | |

(Continued)

*Primary Examiner* — Patrick Cicchino
(74) *Attorney, Agent, or Firm* — Greenblum & Bernstein, P.L.C.

(57) ABSTRACT

A rotary controller selectively-disengageable locking knob assembly, including a hub having a longitudinal axis and an axial bore extending at least partially through the inner hub along the longitudinal axis, wherein the axial bore is configured to receive a shaft of a rotary controller arranged in or on a device surface. The hub includes a radial bore extending from an outer surface of the hub to the axial bore, wherein the radial bore is perpendicular to the axial bore. A knob is concentrically disposed about at least a portion of the hub, wherein the knob includes at least one central bore structured to receive at least a portion of the hub, a radial slot alignable with the radial bore, and a circumferential bottom surface having a first engagement arrangement. The knob is axially moveable on the hub to selectively disengage the first engagement arrangement from contact with the second engagement arrangement.

23 Claims, 20 Drawing Sheets

(56) References Cited

U.S. PATENT DOCUMENTS

| | | | |
|---|---|---|---|
| 3,386,127 A * | 6/1968 | Hitzeroth | G05G 1/12 16/441 |
| 3,430,515 A | 3/1969 | Lawrence | |
| 3,767,880 A | 10/1973 | Austin | |
| 3,982,442 A * | 9/1976 | Shiurila | G05G 1/10 74/10 R |
| 3,986,409 A | 10/1976 | Tripp | |
| 3,994,608 A | 11/1976 | Swiderski et al. | |
| 4,026,397 A | 5/1977 | Raus | |
| 4,036,079 A | 7/1977 | Pratt | |
| 4,084,675 A | 4/1978 | Smith | |
| 4,131,033 A | 12/1978 | Wright et al. | |
| 4,132,129 A | 1/1979 | Pratt | |
| 4,154,125 A | 5/1979 | Frank | |
| D253,289 S | 10/1979 | Kato | |
| 4,237,746 A | 12/1980 | Rossi | |
| 4,347,758 A | 9/1982 | Geil et al. | |
| 4,549,716 A | 10/1985 | Warren | |
| 4,691,895 A | 9/1987 | Garff | |
| 4,733,035 A | 3/1988 | Ohashi | |
| 4,779,305 A | 10/1988 | Gorsek | |
| 5,048,365 A | 9/1991 | Webb | |
| 5,152,187 A | 10/1992 | LaFemina | |
| 5,513,831 A | 5/1996 | Seward | |
| 6,041,868 A | 3/2000 | Matus et al. | |
| D444,695 S | 7/2001 | Decosse | |
| 6,696,915 B2 | 2/2004 | Pan | |
| D525,517 S | 7/2006 | Baldwin | |
| 7,267,027 B2 | 9/2007 | Bertani | |
| D568,715 S | 5/2008 | Gustafson et al. | |
| D569,219 S | 5/2008 | Sjogren | |
| 7,642,673 B2 | 1/2010 | Baier | |
| 8,079,287 B2 | 12/2011 | Castillo | |
| D654,345 S | 2/2012 | McCune et al. | |
| 8,132,295 B1 * | 3/2012 | Otis | A47B 95/02 16/412 |
| 8,733,204 B2 | 5/2014 | Voss | |
| 8,832,905 B2 | 9/2014 | Huang | |
| 8,851,692 B2 * | 10/2014 | Baier | G05G 1/10 362/23.07 |
| D726,159 S | 4/2015 | Swendseid et al. | |
| D773,278 S * | 12/2016 | Livolsi | D8/311 |
| 9,823,683 B2 * | 11/2017 | Livolsi | G05G 1/12 |
| 2014/0021024 A1 | 1/2014 | Heimann | |
| 2014/0047943 A1 | 2/2014 | Camli et al. | |
| 2015/0053043 A1 * | 2/2015 | Livolsi | G05G 1/12 74/553 |
| 2017/0322584 A1 | 11/2017 | Livolsi | |

* cited by examiner

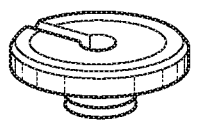
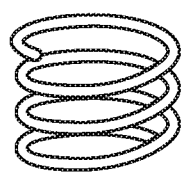
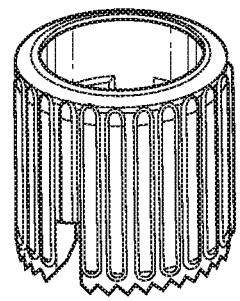
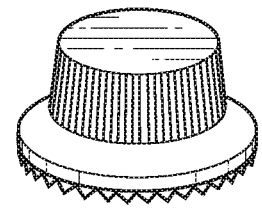
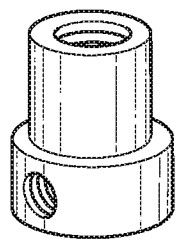
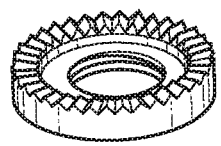
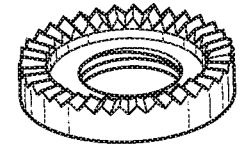
FIG. 18A
FIG. 18B
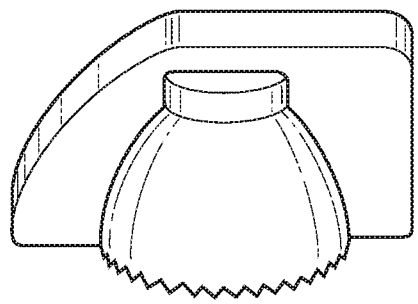
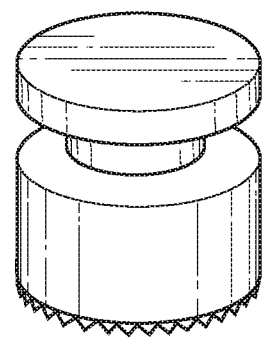
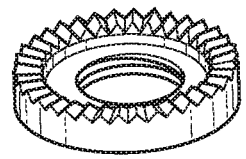
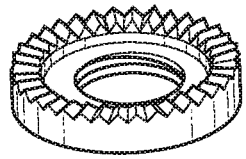
FIG. 18C
FIG. 18D

LOCKING KNOB

CROSS REFERENCE TO RELATED APPLICATION

The present application claims the benefit of U.S. Provisional Application No. 62/539,875, filed Aug. 1, 2017, the contents of which are expressly incorporated herein by reference in its entirety.

BACKGROUND OF THE DISCLOSURE

1. Field of the Disclosure

This disclosure relates to a control mechanisms having angularly adjustable shafts, and more particularly, relates to methods and devices and kits for precluding or preventing inadvertent adjustments of an angularly adjustable control mechanism (e.g., a potentiometer or rotary encoder). More specifically, embodiments of the disclosure are directed to selectively-disengageable rotary controller locking knob assemblies.

2. Background Description

One type of rotary controller is a potentiometer. A potentiometer is a variable resistor or rheostat. Potentiometers are commonly used to control electrical devices, such as volume and other parameters (e.g., tone, mix, balance, time, drive, boost, etc.) on audio equipment (e.g., amplifiers, instruments, effects devices (e.g., stompboxes)). In the case of audio equipment, potentiometers may be used to adjust the level of analog signals present in the various electronic circuits in the device.

Potentiometers may comprise a resistive element, a sliding contact (wiper) that moves along the element, making electrical contact with one part of it, electrical terminals, a housing containing the element and wiper, and an output shaft with which the wiper can be moved, e.g., from one end of the element to the other. Potentiometer output shafts may come in all different configurations, including for example, splined, D-shaped cross-section, hexagonal, or any other polygonal shape.

Another type of rotary control is a rotary encoder. A rotary encoder, also called a shaft encoder, is an electro-mechanical device that converts the angular position or motion of a shaft or axle to an analog or digital code. The output of absolute encoders indicates the current position of the shaft, making them angle transducers. The output of incremental encoders provides information about the motion or position of the shaft.

In many, if not most, potentiometers (or other rotary control) applications, the angular position of the output shaft is manually set by a user (e.g., to adjust a particular parameter). Additionally, in many applications, a number of potentiometers may be arranged on a device (e.g., a stompbox) in close proximity to one another. Once a desired setting (e.g., rotary or angular position) for a particular parameter is achieved, a user may wish for the angular position of the output shaft to remain in that desired position. For example, "perfected" settings for such knobs (which, of course may be subjective) typically take a long time to achieve. If the position of any potentiometer on any device is moved (for example, amongst a plurality of potentiometers of respective various stompbox devices arranged on a pedal board), the user (or perhaps their roadie or technician) will need to re-set that position to the desired position in order to attain the desired parameter setting (and, for example, its desired impact on the resulting tone of a musical instrument, e.g., guitar, connected to the effect device).

For example, musicians experience significant disruptions and inconveniences when potentiometer knobs (or other rotary controls) are accidentally bumped, for example, during transportation of audio equipment, e.g., to or from rehearsals or gigs, requiring re-setting and/or re-calibration of the equipment each time it is used.

Some minimal efforts have been directed in the past to address the problem experienced with adjustable potentiometer output shafts/knobs, namely that the potentiometer output shafts/knobs are easily knocked out of adjustment by incidental contact, and the inconvenience and frustration resulting therefrom.

There is a need, however, for an improved device and method for preventing inadvertent adjustments of rotary control (e.g., potentiometers or rotary encoder) output shafts/knobs.

SUMMARY OF THE EMBODIMENTS OF THE DISCLOSURE

Aspects of the present disclosure are directed to a rotary controller selectively-disengageable locking knob assembly, including a hub having a longitudinal axis and an axial bore extending at least partially through the inner hub along the longitudinal axis, wherein the axial bore is configured to receive a shaft of a rotary controller arranged in or on a device surface. The hub includes a radial bore extending from an outer surface of the hub to the axial bore, wherein the radial bore is perpendicular to the axial bore. A knob is concentrically disposed about at least a portion of the hub. The knob includes at least one central bore structured to receive at least a portion of the hub, a radial slot alignable with the radial bore, and a circumferential bottom surface having a first engagement arrangement. A post is threadedly engaged with the radial bore so as to secure the hub to the shaft of the rotary controller, and the post projects radially outwardly through the radial slot, such that rotation of the knob induces a rotation of the hub via contact of the post with the radial slot. A base has a lower side securely fastenable to the device surface and a circumferential upper surface having a second engagement arrangement configured to interact with the first engagement arrangement to prevent relative rotational movement between the base and the knob when the first engagement arrangement is in contact (e.g., engaged contact) with the second engagement arrangement. A biasing member arranged within the knob and structured and arranged to bias the first engagement arrangement into contact with the second engagement arrangement. The knob is axially moveable on the hub to selectively disengage the first engagement arrangement from contact with the second engagement arrangement.

In some embodiments, the assembly further comprises an adhesive layer structured and arranged to securely fasten the base to the device surface.

In further embodiments, the assembly further comprises a cap threadedly-engageable with the hub, wherein the cap is structured and arranged to maintain the biasing member within the knob.

In additional embodiments, the cap is structured and arranged to restrict an extent of an upward movement of the knob away from the base.

In yet further embodiments, the hub includes a circumferential flange structured and arranged to maintain the biasing member within the knob.

In embodiments, the circumferential flange is structured and arranged to restrict an extent of an upward movement of the knob away from the base.

In further embodiments, the biasing member comprises a spring.

In additional embodiments, the radial slot extends in an axial direction of the knob In yet further embodiments, the radial slot extends to the circumferential bottom surface of the knob.

In some embodiments, the first engagement arrangement and the second engagement arrangement each comprise projecting teeth.

In some embodiments, the first engagement arrangement comprises a single tooth and the second engagement arrangement comprises a plurality of deep notches.

In further embodiments, the base and the knob have approximately a same outer diameter.

In additional embodiments, the hub comprises a cylindrical shape.

In yet further embodiments, the knob comprises one or more of metal, plastics, and composite materials.

In some embodiments, the rotary controller is a potentiometer.

In further embodiments, the rotary controller is a rotary encoder.

In additional embodiments, the base comprises a threaded inner bore structured and arranged to threadedly engage with a threaded collar of the rotary controller.

Additional aspects of the present disclosure are directed to a rotary controller selectively-disengageable locking knob assembly retrofit kit for a rotary controller assembly, comprising the rotary controller selectively-disengageable locking knob assembly, and a set of instructions for attaching the selectively-disengageable locking knob assembly to the rotary controller. The set of instructions comprise removing a knob attached to the shaft of the rotary controller, attaching the base to the device surface, attaching the hub of the selectively-disengageable locking knob assembly to the shaft of the rotary controller, attaching the knob to the hub, and arranging the biasing element in the knob, wherein the biasing element is arranged between the hub and the knob in a radial direction.

In some embodiments, the set of instructions additionally comprise attaching the cap to the hub, wherein the biasing element is arranged between the hub and the cap in an axial direction.

Additional aspects of the present disclosure are directed to a method of releasably locking adjustability of a rotary controller. The method comprises attaching the selectively-disengageable locking knob assembly to the rotary controller. When attached to the rotary controller, the selectively-disengageable locking knob assembly is operable to prevent rotation of the rotary controller when the first engagement arrangement is engaged with the second engagement arrangement.

Additional aspects of the present disclosure are directed to a rotary controller assembly, comprising a rotary controller having a shaft and the selectively-disengageable locking knob assembly arranged on the rotary controller.

In some embodiments, the rotary controller is a potentiometer.

In further embodiments, the rotary controller is a rotary encoder.

Further aspects of the present disclosure are directed to a rotary controller locking knob assembly, comprising a base arrangeable around a rotary controller shaft (or stem), wherein the base includes an upper surface having a selectively engageable base locking structure, a knob connectable to the rotary controller shaft, wherein the knob actuator includes a lower surface having a knob locking structure, which is structured and arranged to correspondingly engage with the base locking structure, and a biasing member having a biasing direction. The knob is biased with the biasing member relative to the base so that the base locking structure is engaged with the knob locking structure. The knob is selectively disengageable from the base through moving the knob in a direction opposite to the biasing direction of the biasing member.

BRIEF DESCRIPTION OF THE DRAWINGS

The novel features which are characteristic of the systems, both as to structure and method of operation thereof, together with further aims and advantages thereof, will be understood from the following description, considered in connection with the accompanying drawings, in which embodiments of the system are illustrated by way of example. It is to be expressly understood, however, that the drawings are for the purpose of illustration and description only, and they are not intended as a definition of the limits of the disclosure. For a more complete understanding of the disclosure, as well as other aims and further features thereof, reference may be had to the following detailed description of the embodiments of the disclosure in conjunction with the following exemplary and non-limiting drawings wherein:

FIGS. 18A-18D schematically depict views of exemplary interchangeable knobs of an exemplary disengageable rotary controller locking knob assembly in accordance with further aspects of the disclosure.

DETAILED DESCRIPTION OF EMBODIMENTS OF THE DISCLOSURE

Figure 1:
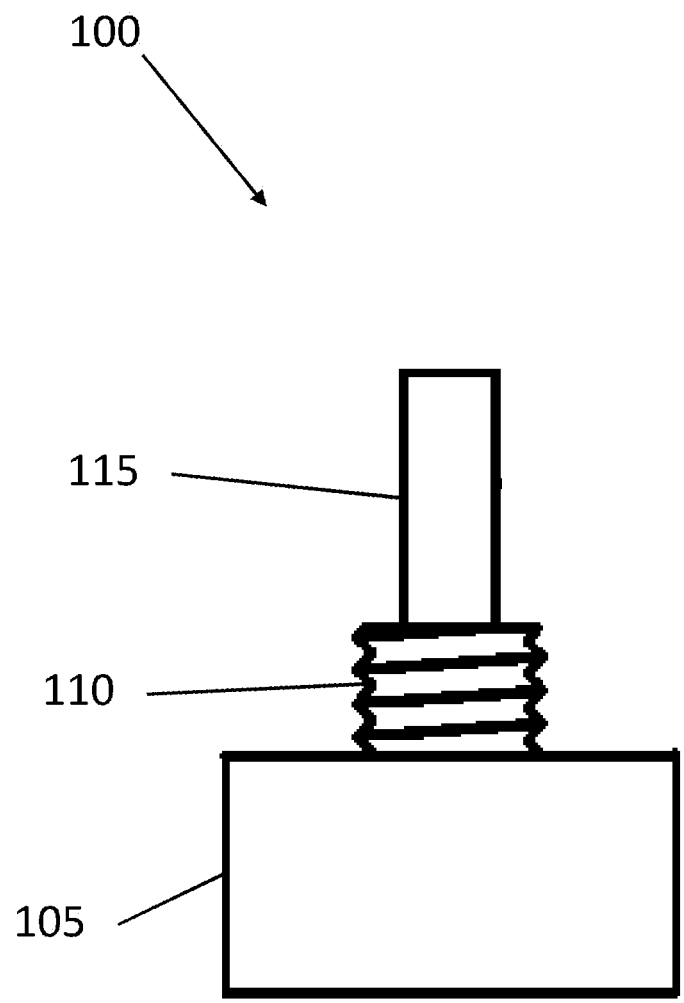
FIG. 1 is side view of a conventional potentiometer.

In the following description, the various embodiments of the present disclosure will be described with respect to the enclosed drawings. As required, detailed embodiments of the embodiments of the present disclosure are discussed herein; however, it is to be understood that the disclosed embodiments are merely exemplary of the embodiments of the disclosure that may be embodied in various and alternative forms. The figures are not necessarily to scale (unless indicated otherwise) and some features may be exaggerated or minimized to show details of particular components. Therefore, specific structural and functional details disclosed herein are not to be interpreted as limiting, but merely as a representative basis for teaching one skilled in the art to variously employ the present disclosure.

The particulars shown herein are by way of example and for purposes of illustrative discussion of the embodiments of the present disclosure only and are presented in the cause of providing what is believed to be the most useful and readily understood description of the principles and conceptual aspects of the present disclosure. In this regard, no attempt is made to show structural details of the present disclosure in more detail than is necessary for the fundamental understanding of the present disclosure, such that the description, taken with the drawings, making apparent to those skilled in the art how the forms of the present disclosure may be embodied in practice.

As used herein, the singular forms "a," "an," and "the" include the plural reference unless the context clearly dictates otherwise. For example, reference to "a magnetic material" would also mean that mixtures of one or more magnetic materials can be present unless specifically excluded. For example, as used herein, the indefinite article "a" indicates one as well as more than one and does not necessarily limit its referent noun to the singular.

Except where otherwise indicated, all numbers expressing quantities used in the specification and claims are to be understood as being modified in all instances by the term "about." Accordingly, unless indicated to the contrary, the numerical parameters set forth in the specification and claims are approximations that may vary depending upon the desired properties sought to be obtained by embodiments of the present disclosure. At the very least, and not to be considered as an attempt to limit the application of the doctrine of equivalents to the scope of the claims, each numerical parameter should be construed in light of the number of significant digits and ordinary rounding conventions.

As used herein, the terms "about" and "approximately" indicate that the amount or value in question may be the specific value designated or some other value in its neighborhood. Generally, the terms "about" and "approximately" denoting a certain value is intended to denote a range within ±5% of the value. As one example, the phrase "about 100" denotes a range of 100±5, i.e. the range from 95 to 105. Generally, when the terms "about" and "approximately" are used, it can be expected that similar results or effects according to the disclosure can be obtained within a range of ±5% of the indicated value.

Additionally, the recitation of numerical ranges within this specification is considered to be a disclosure of all numerical values and ranges within that range (unless otherwise explicitly indicated). For example, if a range is from about 1 to about 50, it is deemed to include, for example, 1, 7, 34, 46.1, 23.7, or any other value or range within the range.

As used herein, the term "and/or" indicates that either all or only one of the elements of said group may be present. For example, "A and/or B" shall mean "only A, or only B, or both A and B". In the case of "only A", the term also covers the possibility that B is absent, i.e. "only A, but not B".

The term "substantially parallel" refers to deviating less than 20° from parallel alignment and the term "substantially perpendicular" refers to deviating less than 20° from perpendicular alignment. The term "parallel" refers to deviating less than 5° from mathematically exact parallel alignment. Similarly "perpendicular" refers to deviating less than 5° from mathematically exact perpendicular alignment.

The term "at least partially" is intended to denote that the following property is fulfilled to a certain extent or completely.

The terms "substantially" and "essentially" are used to denote that the following feature, property or parameter is either completely (entirely) realized or satisfied or to a major degree that does not adversely affect the intended result.

The term "comprising" as used herein is intended to be non-exclusive and open-ended. Thus, for instance a composition comprising a compound A may include other compounds besides A. However, the term "comprising" also covers the more restrictive meanings of "consisting essentially of" and "consisting of", so that for instance "a composition comprising a compound A" may also (essentially) consist of the compound A.

The various embodiments disclosed herein can be used separately and in various combinations unless specifically stated to the contrary.

While the specification discusses aspects of the present disclosure with reference to a particular type of rotary controller (e.g., a potentiometer), it should be understood that the present disclosure contemplates that the aspects of the disclosure may be used with other types of rotary controllers (e.g., rotary encoders).

Additional details of aspects of embodiments of the present disclosure are discussed in commonly-assigned application Ser. No. 13/973,393, titled "Fixed Adjustment Dial," (which published as US 2015/0053043) the contents of which are hereby expressly incorporated by reference herein in their entirety.

Furthermore, some elements of embodiments of the present disclosure, methods of use, and retrofit kits are discussed in commonly-assigned application Ser. No. 15/596,668, titled "Rotary Controller Locking Cap, Method Of Use, And Rotary Controller Locking Cap Kit," the contents of which are hereby expressly incorporated by reference herein in their entirety.

FIG. 1 is side view of an exemplary conventional potentiometer 100. As shown in FIG. 1, the potentiometer 100 includes a potentiometer housing 105, a threaded collar 110, and a rotating shaft 115. As should be understood, the potentiometer 100 includes within the potentiometer housing 105, a resistive element, a sliding contact (wiper) that moves along the element, making electrical contacts with one part of it. Electrical terminals (not shown) may be arranged on an exterior of the potentiometer housing 105. The rotating (or output) shaft 115 is structured and arranged to move the wiper from one end of the element to the other, so as to, for example, adjust the level of analog signals present in the various electronic circuits in the device. It should be understood that potentiometer shafts 115 may come in many different configurations, e.g. splined, D-shaped cross-section, hexagonal, or any other polygonal shape.

Figure 2:
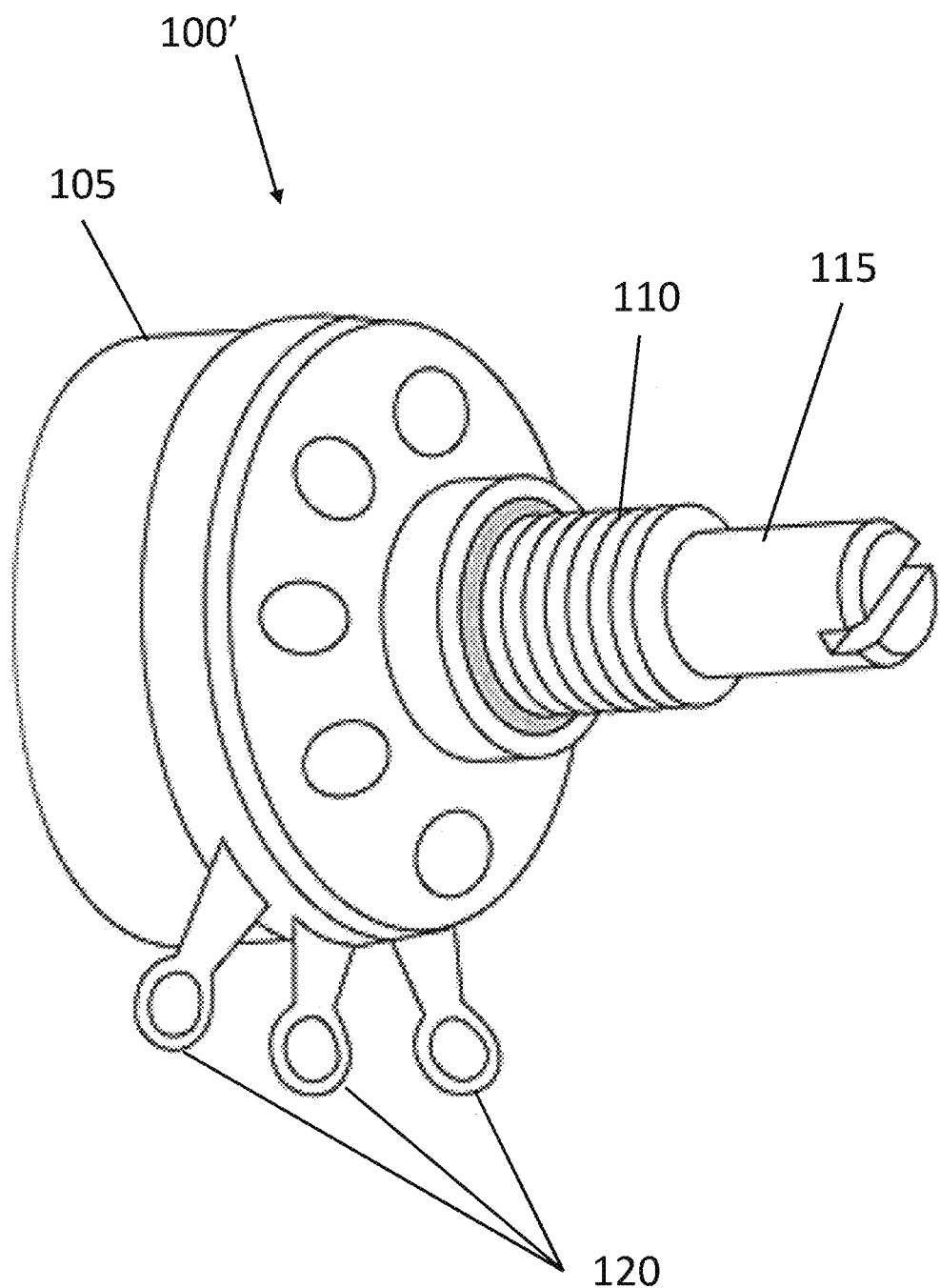
FIG. 2 is a perspective view of a conventional potentiometer.

FIG. 2 is a perspective view of a conventional potentiometer 100'. As shown in FIG. 2, the potentiometer 100' includes a potentiometer housing 105, a threaded collar 110, and a rotating shaft 115. As should be understood, the potentiometer 100 includes within the potentiometer housing 105, a resistive element, a sliding contact (wiper) that moves along the element, making electrical contacts with one part of it. Electrical terminals 120 are arranged on an exterior of the potentiometer housing 105. The rotating (or output) shaft 115 is structured and arranged to move the wiper (or wiper arm) from one end of the element to the other, so as to, for example, adjust the level of analog signals present in the various electronic circuits in the device.

Figure 3:
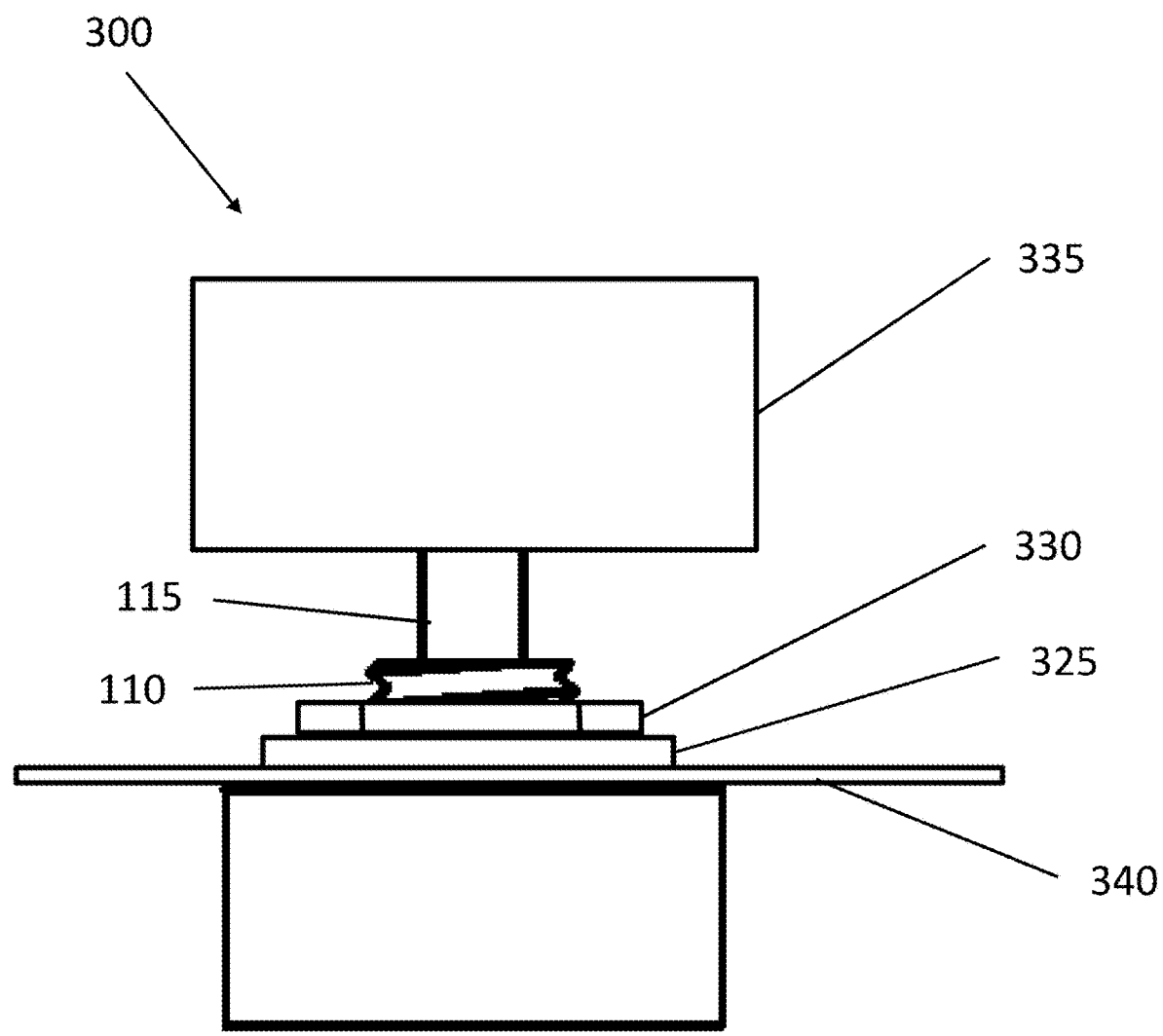
FIG. 3 is side view of a conventional potentiometer assembly having a control knob.

FIG. 3 is side view of a conventional potentiometer assembly 300 having a control knob 335. As should be understood, the control knob 335 is secured to the potentiometer output shaft 115 so as to rotate with the potentiometer output shaft 115. Potentiometers on consumer audio equipment employ knobs 335 to make it easier to adjust the setting of the potentiometer, to allow for indicia or other markings (not shown) to be arranged on the control knob 335 to indicate, for example, setting levels and/or to provide an esthetic element.

As also shown in FIG. 3, the potentiometer assembly 300 may include a retaining nut 330 threadedly fastened to the threaded collar 110 and a washer 325 arranged around the threaded collar 110. The potentiometer assembly 300 may be attached to a housing 340. Without limiting the present disclosure, in embodiments, the housing 340 may be, for example, an instrument housing (e.g., a stringed instrument body), an instrument effect device housing (e.g., a stompbox or rack-mounted effect device housing), a mixer or other audio processing equipment, or an amplification device (e.g., a guitar amplifier). In other contemplated embodiments, the housing 340 may be any housing that accommodates one or more potentiometers.

Figure 4:
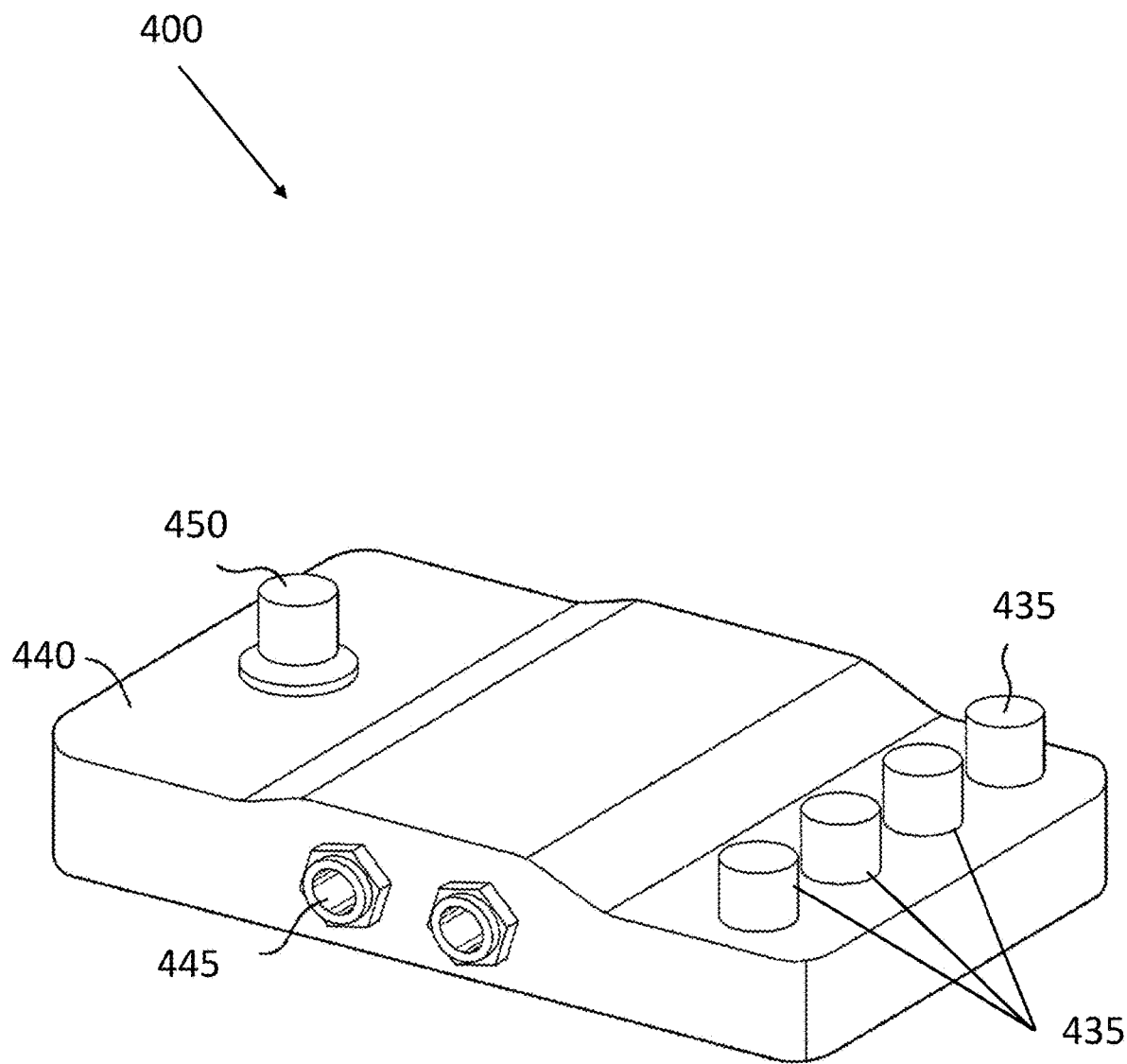
FIG. 4 is perspective view of a conventional "stompbox" effect device having a plurality of potentiometer assemblies with respective control knobs.

FIG. 4 is perspective view of a conventional "stompbox" effect device 400 having a housing 440, and a plurality of potentiometer assemblies (not shown) with respective control knobs 435 arranged on or in the housing 440. As also shown in FIG. 4, the "stompbox" effect device 400 includes a plurality of jacks 445 (e.g., one or more input jacks and one or more output jacks) and an activation switch 450, which selectively activates the circuitry of the "stompbox" effect device 400.

As should be understood, the angular position of the output shaft of each potentiometer may be manually set by a user (e.g., to adjust a particular parameter). Additionally, as shown in FIG. 4, in many applications, a number of potentiometers and their respective control knobs 435 may be arranged on a stompbox 400 in close proximity to one another. When the respective control knobs 435 are arranged in close proximity to one another, a user making an adjustment to one control knob can, for example, inadvertently/unintentionally move another of the control knobs.

Figure 5:
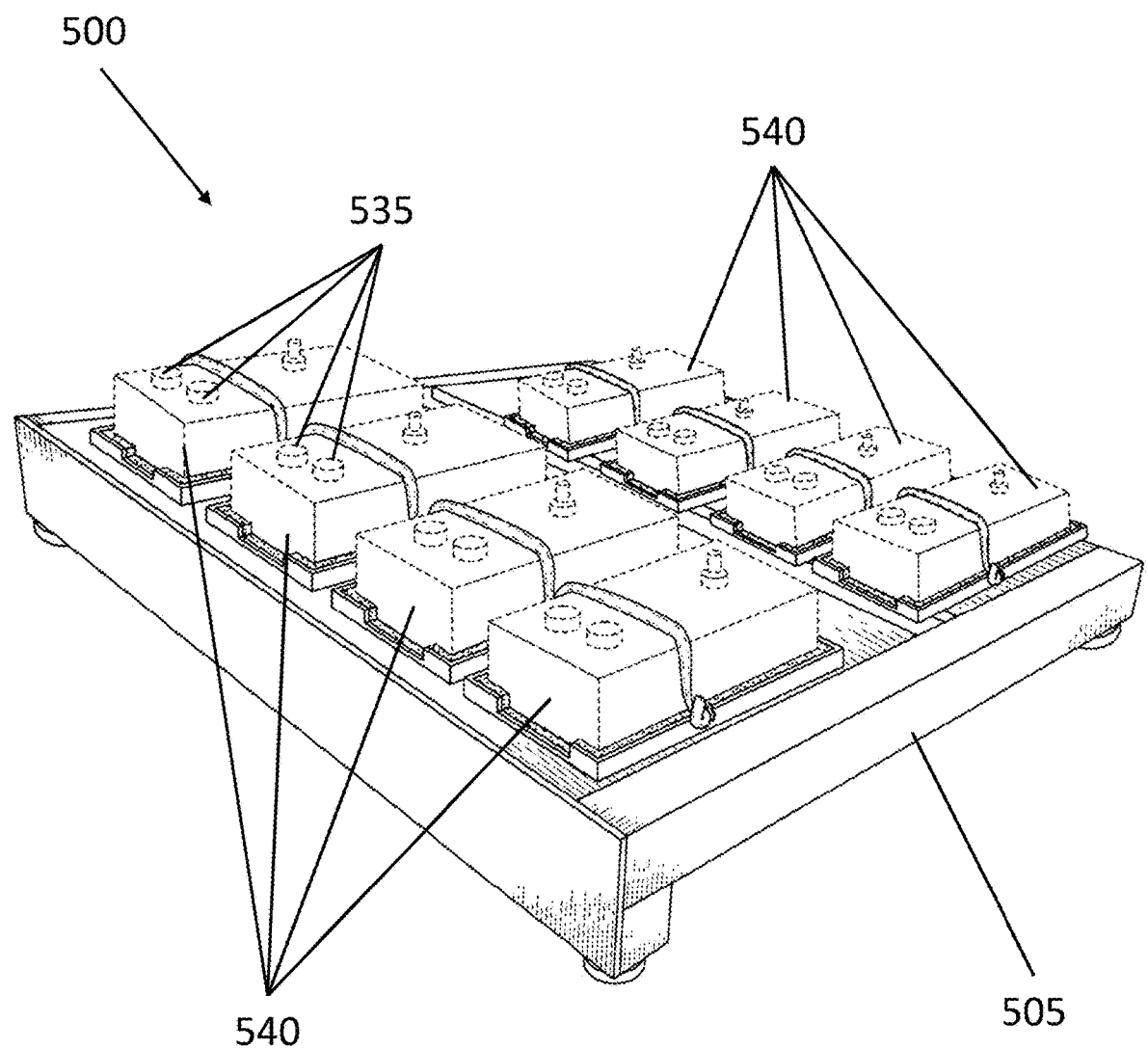
FIG. 5 is perspective view of a conventional pedal board having a plurality of "stompbox" effect devices each having a plurality of potentiometer assemblies with respective control knobs.

FIG. 5 is perspective view of a conventional pedal board assembly 500 including a pedal board 505 and a plurality of "stompbox" effect devices 540 arranged on the pedal board 505. As shown in FIG. 5, each of the plurality of "stompbox" effect devices 540 may have a plurality of respective potentiometer assemblies with respective control knobs 535. As shown in FIG. 5, the plurality of "stompbox" effect devices 540 may be arranged in close proximity to one another. When a plurality of stompbox" effect devices 540 are arranged in close proximity to one another, a user making an adjustment to one control knob 535 of one device 540 may inadvertently/unintentionally move another of the control knobs 535 of the same device or of another device. Additionally, during transportation of audio equipment, e.g., the pedal board 505, for example, to or from rehearsals and/or gigs (or performances), one or more of the control knobs 535 may be inadvertently moved, requiring a review of the current settings and possibly a re-setting and/or re-calibration of the equipment each time it is used.

As noted above, once a desired setting (e.g., rotary or angular position) for a particular parameter is achieved, a user may wish for the angular position of the output shaft to remain in that desired position. For example, "perfected" settings for such knobs (which, of course may be subjective) typically take a long time to achieve. If the position of any potentiometer on any device is moved (for example, amongst a plurality of potentiometers of respective various stompbox devices arranged on a pedal board), the user (or perhaps their roadie or technician) will need to re-set that position to the desired position each in order to attain the desired parameter setting (and, for example, its desired impact on the resulting tone of a musical instrument, e.g., guitar, connected to the effect device). Moreover, if the knobs are moveable, then the setting for each of the knobs need to be checked to ensure they are each positioned as desired.

By implementing aspects of the disclosure, once a desired or "perfected" (or even a temporary) setting for a particular potentiometer (or other rotary control) is established, a user may engage the selectively-disengageable rotary controller locking knob assembly in order to prevent further access to the potentiometer output shaft 115. By doing so, any further unintentional changes to the potentiometer setting are precluded. In such a manner, in accordance with aspects of the present disclosure, the selectively-disengageable rotary controller locking knob assembly 600 effectively disables (e.g., temporarily) the adjustability of the potentiometer 100, for example, in order to prevent inadvertent and/or undesired changes to the potentiometer setting.

Thus, for example, once an adjustment of a particular potentiometer has been made, e.g., to achieve a desired sound, a user can engage the selectively-disengageable rotary controller locking knob assembly 600 to prevent any further changes to the particular potentiometer. Should a user desire to make adjustments to the potentiometer setting, the user may disengage the selectively-disengageable rotary controller locking knob assembly 600 to make adjustments to the potentiometer output shaft 115. In some applications, for example, on a single effect device, there some potentiometer-controlled parameters that, once set as desired, may not need to change at all or as readily (e.g., drive, tone, and/or mix) and there may be other potentiometer-controlled parameters (e.g., delay time, volume) that may undergo frequent adjustment. In accordance with aspects of the disclosure, selectively-disengageable rotary controller locking knob assemblies 600 may be utilized on those potentiometer output shafts that may not need to be adjusted at all or as readily, in addition to potentiometer output shafts of those other potentiometer-controlled parameters that may undergo frequent adjustment (e.g., via respective control knobs).

Figure 6A:
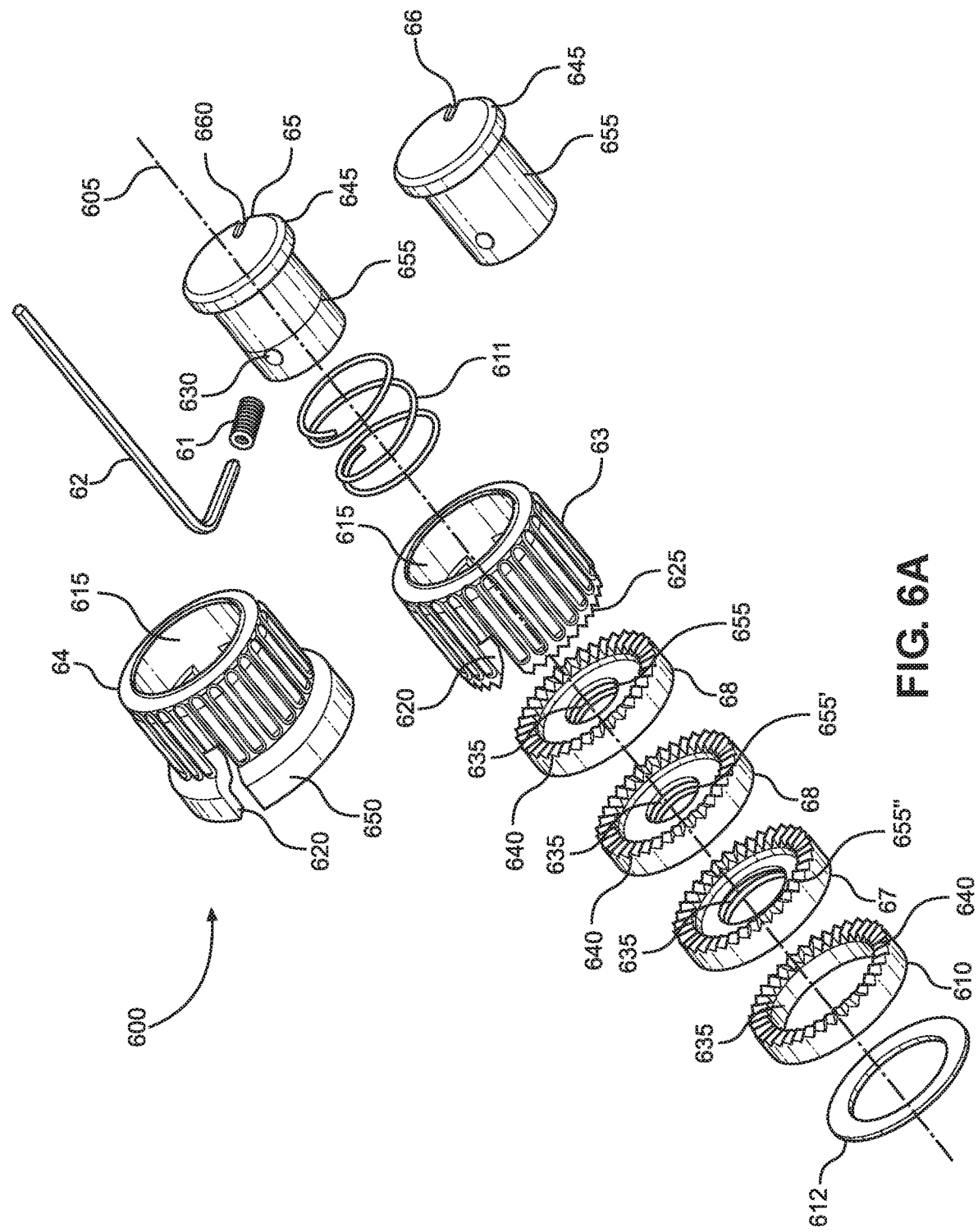
FIG. 6A is an exploded view of an exemplary embodiment of a selectively-disengageable rotary controller locking knob assembly (also including alternative components) in accordance with aspects of the disclosure.

FIG. 6A is an exploded view of an exemplary embodiment of a selectively-disengageable rotary controller locking knob assembly 600 (also including alternative components and tool) in accordance with aspects of the disclosure. As shown in FIG. 6A, the selectively-disengageable rotary controller locking knob assembly 600 includes a hub 65 having a longitudinal axis and an axial bore (not shown) extending at least partially through the hub 65 along the longitudinal axis 605, wherein the axial bore is configured to receive a shaft (not shown) of a rotary controller (not shown) arranged in or on a device surface (not shown). In contemplated embodiments, the rotary controller may be a potentiometer or a rotary encoder.

As shown in FIG. 6A, the hub 65 includes a radial bore 630 extending from an outer surface of the hub 65 to the axial bore (not shown). The radial bore 630 is perpendicular to the axial bore. As shown in FIG. 6, a knob 63 is concentrically disposed about at least a portion of the hub 65. The knob 63 includes at least one central bore 615 structured to receive at least a portion of the hub 65. The knob 63 also includes a radial slot 620 alignable with the radial bore 630. As shown in FIG. 6A, the knob 63 includes a circumferential bottom surface (or downward facing surface) having a first engagement arrangement 625.

As shown in FIG. 6A, a post 61 (e.g., a grub screw or set screw) is threadedly engagable with the radial bore 630 so as to secure the hub 65 to the shaft of the rotary controller (not shown). Additionally, in accordance with aspects of the disclosure, the post 61 is structured and arranged to project radially outwardly through the radial slot 620, such that rotation of the knob 63 induces a rotation of the hub 65 via contact of the post 61 with the radial slot 620.

As shown in FIG. 6A, in embodiments the selectively-disengageable rotary controller locking knob assembly 600 includes a base (for example, one of base 68, base 69, base 67, and base 610) securely fastenable to a device surface (not shown) so as to prevent movement (e.g., rotational movement) of the base. For example, in embodiments, the base 610 may be securely fastenable to the device surface via having a lower side of the base 610 attached to a surface of the device via adhesive (e.g., double sided adhesive tape ring 612, e.g., a coated polyester tape). In further embodiments, the base (for example, base 68, base 69, and base 67) may be securely fastenable to the device via a threaded engagement between external threads of the device (e.g., threaded collar 110 of a potentiometer, see FIG. 1), and internally-threads 635 of the base (for example, base 68, base 69, base 67). As shown in FIG. 6A, the alternative bases 68, 69, and 67 each have differently-sized internal bores 655, 655', 655" structured to receive differently-sized threaded collars (e.g., of a rotary controller (e.g., potentiometer).

As shown in FIG. 6A, in accordance with aspects of the disclosure, the base (for example, each of base 68, base 69, base 67, and base 610) include a circumferential upper surface having a second engagement arrangement 640 configured to interact with the first engagement arrangement 625 to prevent relative rotational movement between the base (for example, one of base 68, base 69, base 67, and base 610) and the knob 63 when the first engagement arrangement 625 is in contact (e.g., engaged contact) with the second engagement arrangement 640. In embodiments, the first engagement arrangement 625 and the second engagement arrangement 640 each comprise projecting "teeth" (e.g., v-shaped projections and valleys) configured for mutual engagement.

As shown in FIG. 6A, the hub 65 includes a cylindrical-shaped region 655, and the selectively-disengageable rotary controller locking knob assembly 600 additionally includes a biasing member 611 arranged within the central bore 615 of the knob 63 and outside of the cylindrical-shaped region 655. In accordance with aspects of the disclosure, with this exemplary embodiment, an upper end of the biasing member 611 is retained in place via contact with the hub 65, and the lower end of the biasing member 611 engages with an inner flange (not shown) of the knob 63, such that the biasing member 611 moves (e.g., compresses or expands) with axial movement of the knob 63 along the hub 65. In embodiments, the biasing member 611 may be a spring, e.g., a coil spring (for example, having a 0.030" diameter).

As such, in accordance with aspects of the disclosure, the biasing member 611 is structured and arranged to bias the first engagement arrangement 625 into contact with the second engagement arrangement 640. As shown in FIG. 6A, with this exemplary embodiment, the hub 65 also includes a circumferential flange 645 structured and arranged to maintain the biasing member 611 within the knob (when assembled). The circumferential flange 645 is also structured and arranged to restrict an extent of an upward movement of the knob 63 away from the base (e.g., one of base 68, base 69, base 67, and base 610). Additionally, as shown in FIG. 6A, in accordance with aspects of the disclosure, the outer diameter of the circumferential flange 645 is approximately the same (e.g., slightly smaller than) the inner diameter of the central bore 615 of the knob 63 so that with upward movement of the knob 63, the circumferential flange 645 is received within the central bore 615.

In accordance with aspects of the disclosure, the knob 63 is axially moveable on the hub 65 to selectively disengage the first engagement arrangement 625 from contact with the second engagement arrangement 640. As such, in accordance with aspects of the disclosure when the first engagement arrangement 625 is in fixed (e.g., engaged) contact with the second engagement arrangement 640, the knob 63 is prevented from rotational actuation so as to prevent unwanted (e.g., unintentional) changes to a rotary controller (e.g., potentiometer) setting. In accordance with further aspects of the disclosure, when the first engagement arrangement 625 is disengaged (i.e., selectively-disengaged) from the second engagement arrangement 640, the knob 63 is able to be rotationally actuated so as to allow desired (e.g., intentional) changes to a rotary controller (e.g., potentiometer) setting.

As shown in FIG. 6A, embodiments of the disclosure are directed to a rotary controller locking knob assembly, having a base (e.g., base 610) arrangeable around a rotary controller stem or shaft (not shown). The base includes an upper surface having a selectively engageable base locking structure (e.g., the second engagement arrangement 640). A knob 63 is connectable to the rotary controller shaft via the hub 65 and post 61, wherein the knob 63 includes a lower surface having a knob locking structure (e.g., the first engagement arrangement 625), which is structured and arranged to correspondingly engage with the base locking structure (e.g., the second engagement arrangement 640). The rotary controller locking knob assembly 600 includes a biasing member 611 having a biasing direction (e.g. downwardly). The knob 63 is biased with the biasing member 611 relative to the base (e.g., base 610) so that the base locking structure (e.g., the second engagement arrangement 640) is engaged with the knob locking structure (e.g., the first engagement arrangement 625). The knob (e.g., knob 63) is selectively disengageable from the base (e.g., base 610) through moving the knob 63 in a direction opposite to the biasing direction of the biasing member 611 (e.g., upwardly).

As shown in FIG. 6A, in some embodiments, an adhesive layer (e.g., a double-sided tape ring 612) may be utilized to securely fasten the base 610 to the device surface (not shown). It should also be understood that the disclosure contemplates other adhesives (e.g., liquid adhesives) may also be utilized to securely fasten the base 610 to the device surface.

As shown in FIG. 6A, the radial slot 620 extends in an axial direction 605 of the knob 63. Additionally, in accordance with aspects of the disclosure, in embodiments the radial slot 620 extends to the base of the knob 63 so as to provide for easier changing of different knobs (e.g., alternative knob 64), and to also improve manufacturability of the knob 63. As should be understood, alternative knob 64 may utilized in place of the knob 63. Additionally, in accordance with aspects of the disclosure, different types (or styles) of knobs (e.g., Fender-style, chicken-heads (each having respective first engagement arrangements) could be interchanged while utilizing the selectively-disengageable rotary controller locking knob assembly 600.

As shown in FIG. 6A, in some contemplated embodiments, the base (e.g., bases 68, 79, 67, and 610) and the knob 63 have approximately a same outer diameter. In other contemplated embodiments, the base (e.g., bases 68, 79, 67, and 610) and the knob 64 may have different outer diameters, and the knob 64 may additionally include a downwardly projecting skirt 650 that is structured and arranged to cover over the base (e.g., one of bases 68, 79, 67, and 610) and "hide" the base when in an engaged state therewith. As shown in FIG. 6A, it should be noted that in comparing knob 63 and knob 64, these knobs may have corresponding regions (e.g., a griping region) having the same diameter (e.g., a ¾" diameter, with other diameters contemplated by the disclosure).

FIG. 6A also shows an alternative hub 66, which in accordance with aspects of the disclosure, may have a differently-sized internal bore (e.g., larger) configured for engagement with a rotary controller shaft having a different outer diameter (e.g., larger). For example, by way of non-limiting example, hub 65 may have an internal bore (not shown) configured for engagement with a 0.250" shaft of a rotary controller, whereas hub 66 may have an internal bore (not shown) configured for engagement with a 6 mm shaft of a rotary controller.

In embodiments, the knobs 63, 64 may comprises one or more of metal (e.g., aluminum, steel), plastics (e.g., ABS plastic), and composite materials. In embodiments, the hubs 65, 66 may comprises one or more of metal, plastics, and composite materials. In embodiments, the bases 68, 79, 67, and 610 may comprises one or more of metal, plastics, and composite materials. Without limiting the present disclosure, in embodiments, depending on materials used, the knobs 63, 64 may be molded, CNC manufactured, die cast, formed with a lathe, and/or 3D printed.

FIG. 6A also shows a tool 62 (e.g. a hex wrench or screw driver) that may be used to rotate the post 61 (e.g., grub screw), so as to fix the hub 65 to the shaft of a rotary controller. Additionally, as shown in FIG. 6A, in embodiments, the hub 65 may include an indicator 660 (e.g., a marking and/or indentation) used to indicate the rotational setting of the rotary controller. In embodiments, as shown in FIG. 6A, the indicator 660 may be arranged opposite (e.g., 180° from a top view perspective) the radial bore 630.

Figure 6B:
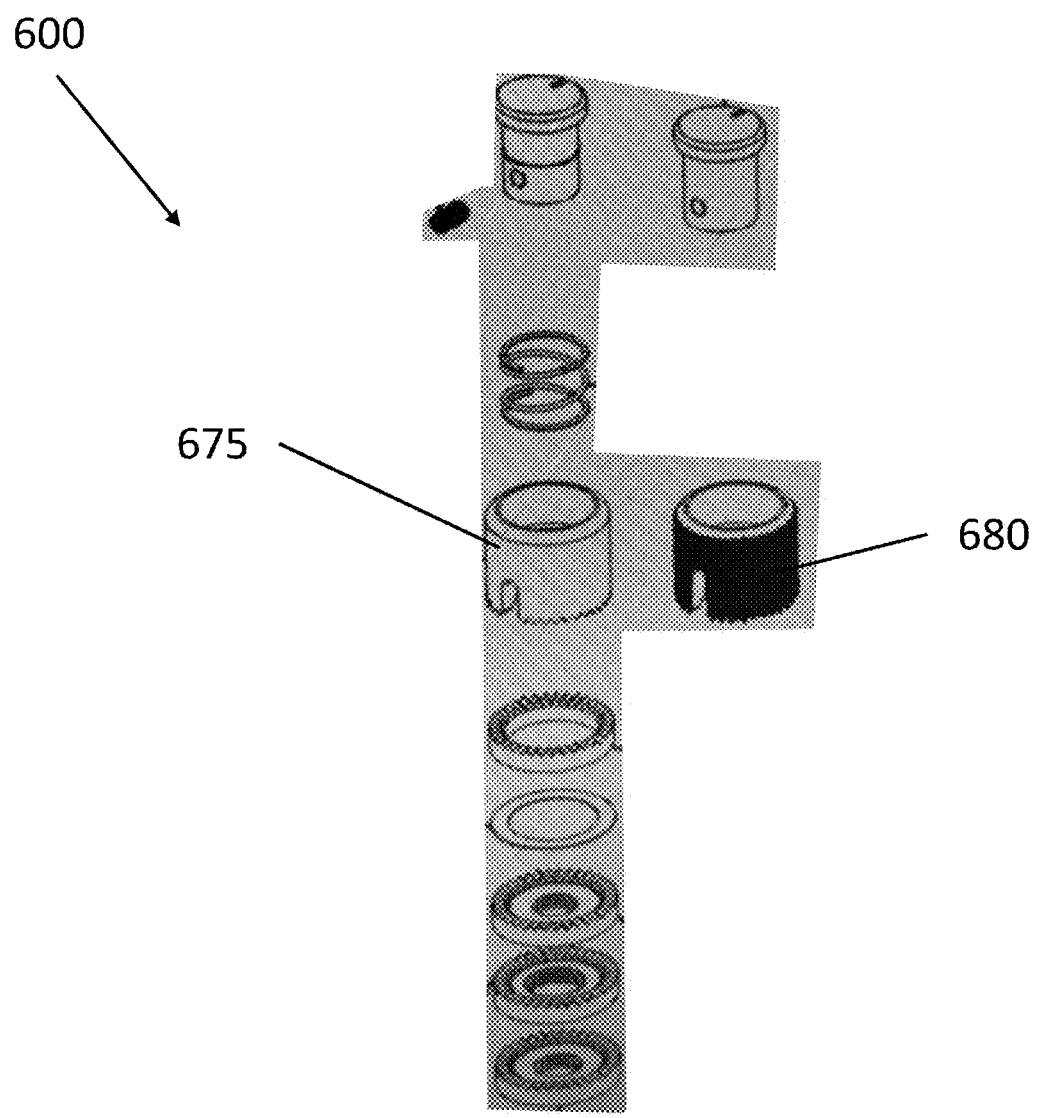
FIG. 6B is an exploded view of an exemplary embodiment of a selectively-disengageable rotary controller locking knob assembly (also including alternative components) in accordance with aspects of the disclosure.

FIG. 6B is an exploded view of an exemplary embodiment of a selectively-disengageable rotary controller locking knob assembly 600 (also including alternative components) in accordance with aspects of the disclosure. As shown in FIG. 6B, with this exemplary embodiment, the knob may be a metal knob 675 or a coated metal knob 680.

Figure 7A:
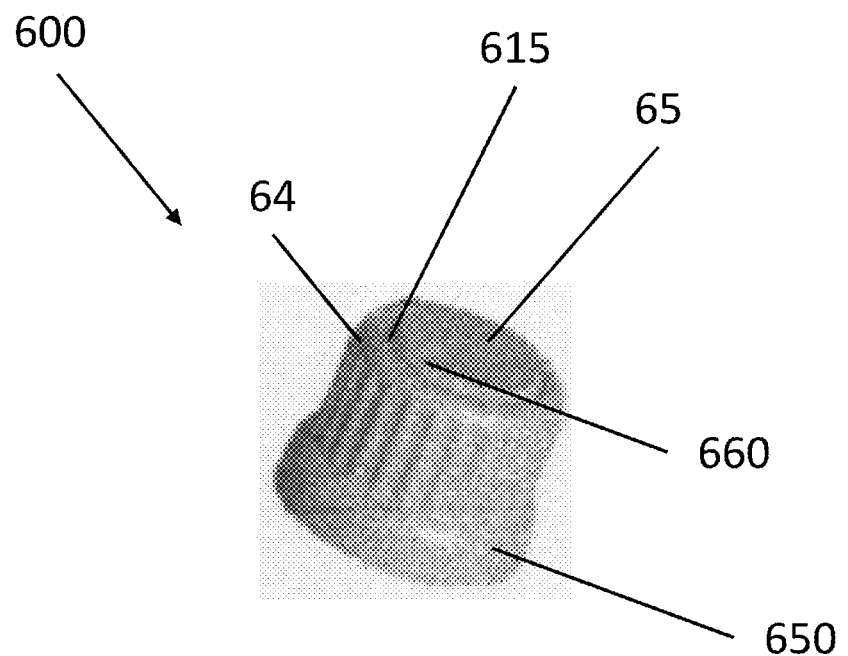
FIG. 7A is an assembled view of an exemplary embodiment of a selectively-disengageable rotary controller locking knob assembly in accordance with aspects of the disclosure.

FIG. 7A shows an assembled view of an exemplary embodiment of a selectively-disengageable rotary controller locking knob assembly 600 in accordance with aspects of the disclosure. As shown in FIG. 7A, when assembled and in an engaged state, the selectively-disengageable rotary controller locking knob assembly 600 appears similar (e.g., has a similar size and/or shape) to a conventional knob. As shown in the view of FIG. 7A, the knob 64 is concentrically arranged around the hub 65, which is viewable through the central bore 615 of the knob 64. With the exemplary embodiment of FIG. 7A, the knob 64 includes a downwardly projecting skirt 650 that is structured and arranged to cover over the base (not shown) to "hide" the base when in an engaged state therewith. As shown in FIG. 7A, in accordance with aspects of the disclosure, when the knob 64 is engaged with the base (not shown), the top surface of the knob 64 is approximately flush with the top surface of the hub 65. While not shown in FIG. 7A, when the knob 64 is disengaged from the base (not shown) by being moved axially upward, the top surface of the knob 64 is raised above the top surface of the hub 65.

Figure 7B:
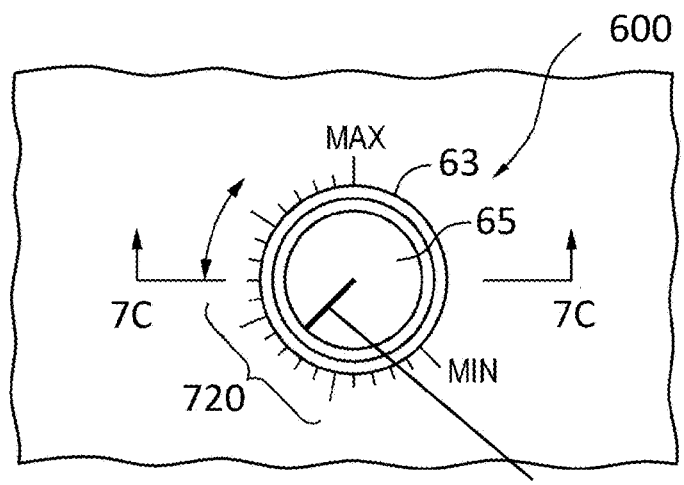
FIG. 7B is top view of an exemplary embodiment of a selectively-disengageable rotary controller locking knob assembly in accordance with aspects of the disclosure.

FIG. 7B is top view of an exemplary embodiment of a selectively-disengageable rotary controller locking knob assembly 600 in accordance with aspects of the disclosure. As shown in FIG. 7B, the selectively-disengageable rotary controller locking knob assembly 600 includes the knob 63 and the hub 65. As shown in FIG. 7B, the hub 65 includes the indictor 660. As should be understood, the knob 63 may be rotated in rotation direction 780. In embodiments the, knob 63 may be rotatable through 360 degrees. In other embodiments, the knob 63 may be rotatable through less than 360 degrees. As shown in FIG. 7B, the device may include markings 775 to quantify the setting of the rotary controller.

Figure 7C:
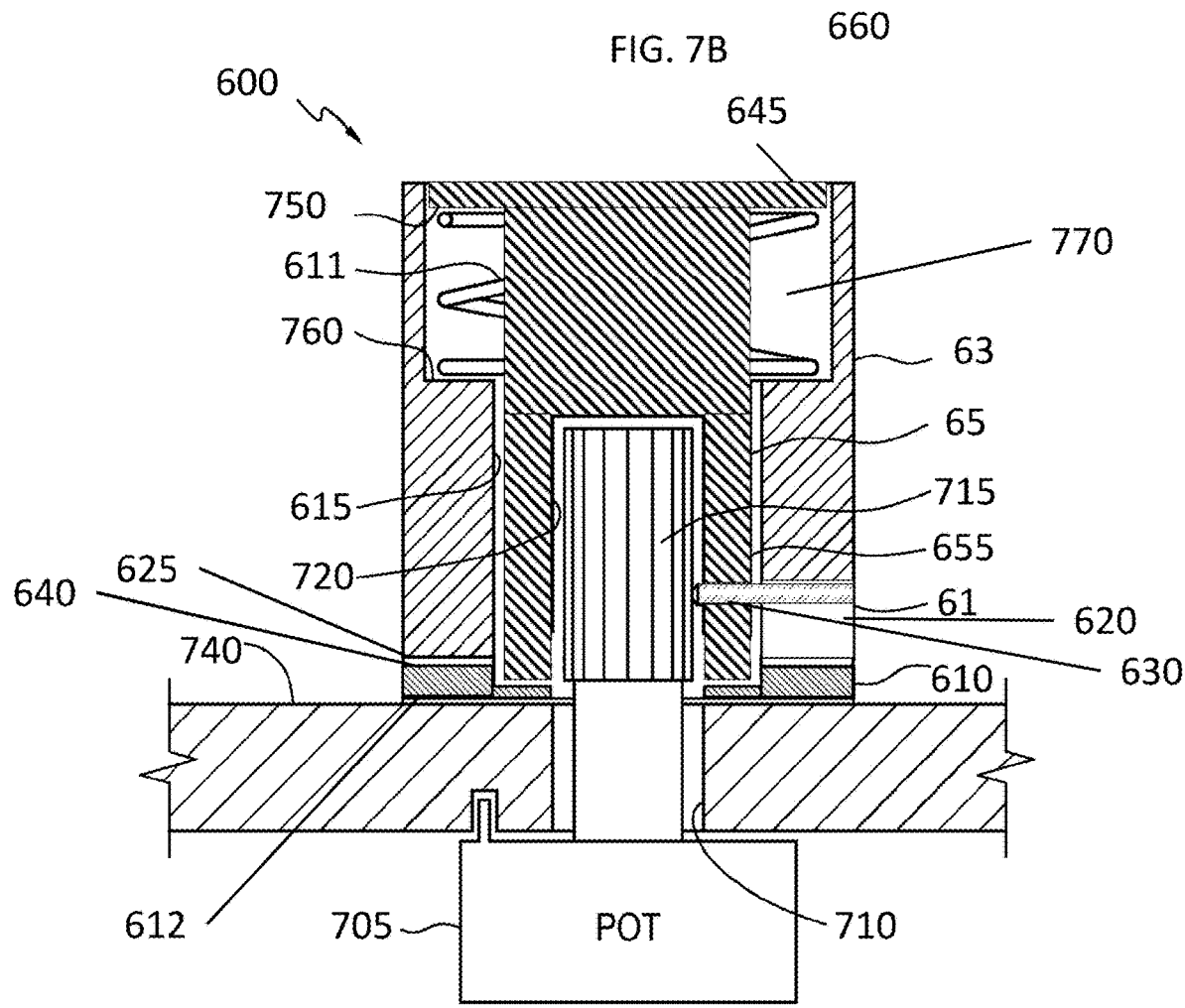
FIG. 7C is a sectional view of an exemplary embodiment of a selectively-disengageable rotary controller locking knob assembly in accordance with aspects of the disclosure.

FIG. 7C is a sectional view of an exemplary embodiment of a selectively-disengageable rotary controller locking knob assembly 600 in accordance with aspects of the disclosure. As shown in FIG. 7C, the selectively-disengageable rotary controller locking knob assembly 600 is attached to a shaft 715 of a potentiometer (or pot) 705 through a mounting surface 740.

As shown in FIG. 7C, the selectively-disengageable rotary controller locking knob assembly 600 includes a hub 65 having a longitudinal axis and an axial bore 720 extending at least partially through the hub 65 along the longitudinal axis, wherein the axial bore 720 is configured to receive the shaft 715 of a rotary controller (e.g., potentiometer) 705 arranged in or on a device mounting surface 740. In contemplated embodiments, the rotary controller may be a potentiometer or a rotary encoder.

As shown in FIG. 7C, the hub 65 includes a radial bore 630 extending from an outer surface of the hub 65 to the axial bore 720. The radial bore 630 is perpendicular to the axial bore 720. As shown in FIG. 7C, the knob 63 is concentrically disposed about at least a portion of the hub 65. The knob 63 includes at least one central bore 615 structured to receive at least a portion of the hub 65. The knob 63 also includes a radial slot 620 alignable with the radial bore 630. As shown in FIG. 7C, the knob 63 includes a circumferential bottom surface (or downward facing surface) having a first engagement arrangement 625.

As shown in FIG. 7C, a post 61 (e.g., a grub screw or set screw) is threadedly engagable with the radial bore 630 so as to secure the hub 65 to the shaft 715 of the rotary controller 705. Additionally, in accordance with aspects of the disclosure, the post 61 is structured and arranged to project radially outwardly through the radial slot 620, such that rotation of the knob 63 induces a rotation of the hub 65 via contact of the post 61 with the side walls of the radial slot 620.

As shown in FIG. 7C, in embodiments the selectively-disengageable rotary controller locking knob assembly 600 includes a base 610 securely fastenable to the mounting surface 740 so as to prevent movement (e.g., rotational movement) of the base 610. For example, in embodiments, the base 610 may be securely fastenable to the mounting surface 740 via having a lower side of the base 610 attached to a surface via adhesive (e.g., double sided adhesive tape ring, e.g., a coated polyester tape).

As shown in FIG. 7C, in accordance with aspects of the disclosure, the base 610 includes a circumferential upper surface having a second engagement arrangement 640 configured to interact with the first engagement arrangement 625 to prevent relative rotational movement between the base 610 and the knob 63 when the first engagement arrangement 625 is in contact with the second engagement arrangement 640. In embodiments, the first engagement arrangement 625 and the second engagement arrangement 640 each comprise a circumferential ring of projecting "teeth" (e.g., v-shaped projections and valleys) configured for mutual engagement. In other further contemplated embodiments, the first engagement arrangement 625 may comprise a single projecting "tooth" and the second engagement arrangement 640 may comprise a circumferential ring (or partial circumferential ring) of "valleys". In some contemplated embodiments, one or more of the "valleys" may have differing (e.g., greater) depths, structured to more securely receive the "tooth" of the knob (as compared to the "valleys" in the base have a shallower depth). In accordance with aspects of the disclosure the "valleys" having greater depth may be used (e.g., in a similar manner to detents) one or more preferred positions and/or reference positions (e.g., for dark stage environments and/or visually-impaired users).

As shown in FIG. 7C, the hub 65 includes a cylindrical-shaped region 655, and the selectively-disengageable rotary controller locking knob assembly 600 additionally includes a biasing member 611 arranged within an upper region 770 of the central bore 615 of the knob 63 and outside of the cylindrical-shaped region 655. In accordance with aspects of the disclosure, with this exemplary embodiment, an upper end of the biasing member 611 is retained in place via contact with a lower face 750 the hub 65, and the lower end of the biasing member 611 engages with an inner flange 760 of the knob 63, such that the biasing member 611 moves (e.g., compresses or expands) with axial movement of the knob 63 along the hub 65. In embodiments, the biasing member 611 may be a spring, e.g., a coil spring (for example, having a 0.030" diameter).

As such, in accordance with aspects of the disclosure, the biasing member 611 is structured and arranged to bias the first engagement arrangement 625 into contact with the second engagement arrangement 640. As shown in FIG. 7C, with this exemplary embodiment, the hub 65 also includes a circumferential flange 645 (having the lower face 750) structured and arranged to maintain the biasing member 611 within the knob (when assembled). The circumferential flange 645 is also structured and arranged to restrict an extent of an upward movement of the knob 63 away from the base 610. Additionally, as shown in FIG. 7C, in accordance with aspects of the disclosure, the outer diameter of the circumferential flange 645 is approximately the same (e.g., slightly smaller than) the inner diameter of the upper region 770 of the central bore 615 of the knob 63 so that with upward movement of the knob 63, the circumferential flange 645 is received within the upper region 770 of the central bore 615.

In accordance with aspects of the disclosure, the knob 63 is axially moveable on the hub 65 to selectively disengage the first engagement arrangement 625 from contact with the second engagement arrangement 640. As such, in accordance with aspects of the disclosure when the first engagement arrangement 625 is in fixed (e.g., engaged) contact with the second engagement arrangement 640, the knob 63 is prevented from rotational actuation so as to prevent unwanted (e.g., unintentional) changes to a rotary controller (e.g., potentiometer) setting. In accordance with further aspects of the disclosure, when the first engagement arrangement 625 is disengaged (i.e., selectively-disengaged) from the second engagement arrangement 640, the knob 63 is able to be rotationally actuated so as to allow desired (e.g., intentional) changes to a rotary controller (e.g., potentiometer) setting.

As shown in FIG. 7C, embodiments of the disclosure are directed to a rotary controller locking knob assembly, having a base 610 arrangeable around a rotary controller shaft 715.

The base 610 includes an upper surface having a selectively engageable base locking structure (e.g., the second engagement arrangement 640). A knob 63 is connectable to the rotary controller shaft via the hub 65 and post 61, wherein the knob 63 includes a lower surface having a knob locking structure (e.g., the first engagement arrangement 625), which is structured and arranged to correspondingly engage with the base locking structure (e.g., the second engagement arrangement 640). The rotary controller locking knob assembly 600 includes a biasing member 611 having a biasing direction (e.g. downwardly). The knob 63 is biased with the biasing member 611 relative to the base (e.g., base 610) so that the base locking structure (e.g., the second engagement arrangement 640) is engaged with the knob locking structure (e.g., the first engagement arrangement 625). The knob (e.g., knob 63) is selectively disengageable from the base (e.g., base 610) through moving the knob 63 in a direction opposite to the biasing direction of the biasing member 611 (e.g., upwardly).

Figure 8:
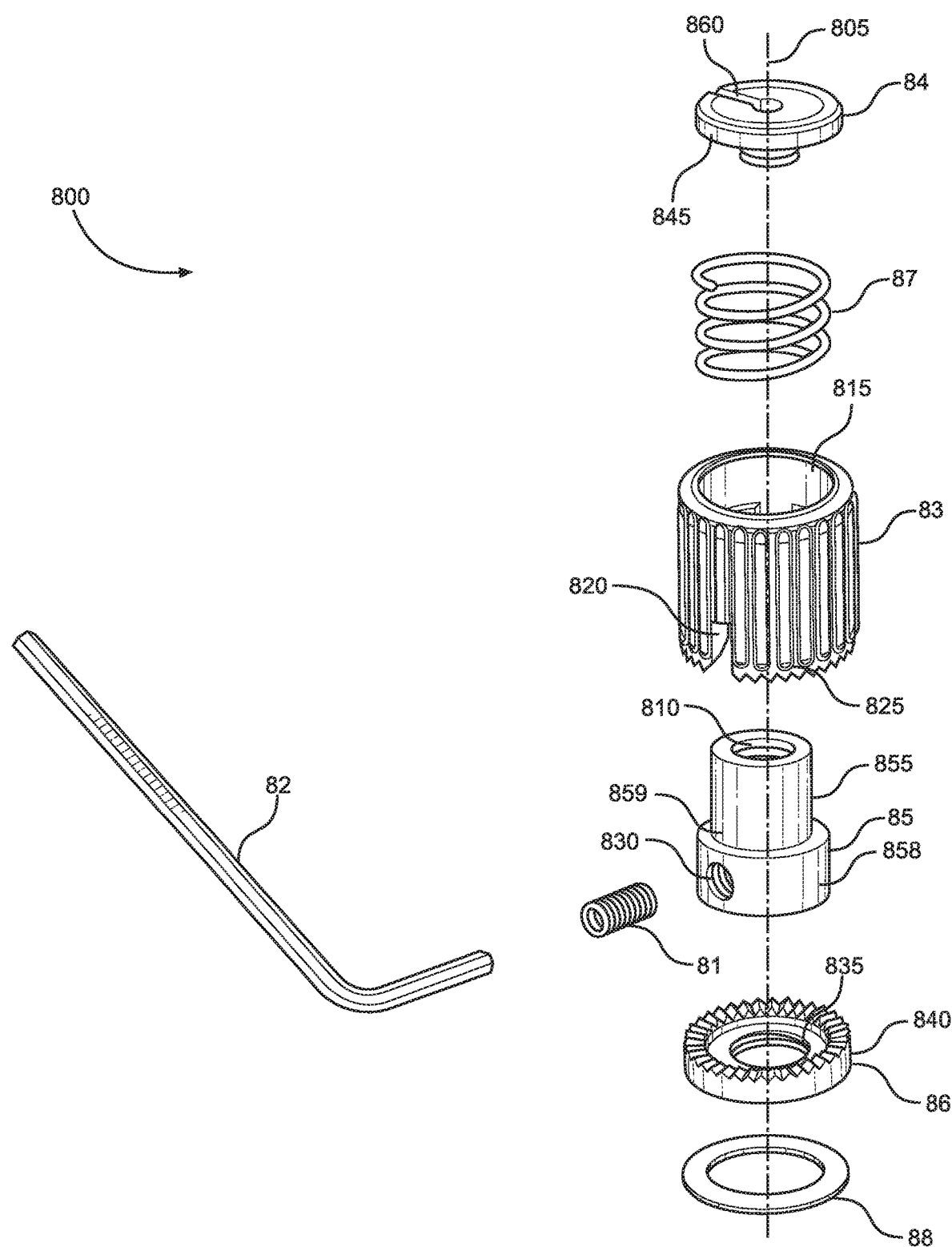
FIG. 8 is an exploded view of an exemplary embodiment of a selectively-disengageable rotary controller locking knob assembly in accordance with further aspects of the disclosure.

FIG. 8 is an exploded view of a further exemplary embodiment of a rotary controller selectively-disengageable locking knob assembly 800 (and also including a tool) in accordance with aspects of the disclosure. As shown in FIG. 8, the selectively-disengageable rotary controller locking knob assembly 800 includes a hub 85 having a longitudinal axis and an upper axial bore 810 extending at least partially through the hub 85 along the longitudinal axis and a lower axial bore (not shown) extending at least partially through the hub 85 along the longitudinal axis. The upper axial bore 810 is structured to receive a cap 84 and the lower axial bore is configured to receive a shaft (not shown) of a rotary controller (not shown) arranged in or on a device surface (not shown). In some contemplated embodiments, the hub 85 may have a single bore that is structured to receive a cap 84 in one end and to receive a shaft (not shown) in the other end. In contemplated embodiments, the rotary controller may be a potentiometer or a rotary encoder.

As shown in FIG. 8, the hub 85 includes a radial bore 830 extending from an outer surface of the hub 85 to the axial bore 810. The radial bore 830 is perpendicular to the axial bore 810. As shown in FIG. 8, a knob 83 is concentrically disposed about at least a portion of the hub 85. The knob 83 includes at least one central bore 815 structured to receive at least a portion of the hub 85. The knob 83 also includes a radial slot 820 alignable with the radial bore 830. As shown in FIG. 8, the knob 83 includes a circumferential bottom surface (or downward facing surface) having a first engagement arrangement 825.

As shown in FIG. 8, a post 81 (e.g., a grub screw or set screw) is threadedly engagable with the radial bore 830 so as to secure the hub 85 to the shaft of the rotary controller (not shown). Additionally, in accordance with aspects of the disclosure, the post 81 is structured and arranged to project radially outwardly through the radial slot 820, such that rotation of the knob 83 induces a rotation of the hub 85 via contact of the post 81 with the radial slot 820.

As shown in FIG. 8, in embodiments the selectively-disengageable rotary controller locking knob assembly 800 includes a base 86 securely fastenable to a device surface (not shown) so as to prevent movement (e.g., rotational movement) of the base 86. For example, in embodiments, the base 86 may be securely fastenable to the device surface via having a lower side of the base 86 attached to a surface of the device via adhesive (e.g., double sided adhesive tape ring 88, e.g., a coated polyester tape). In further embodiments, the base 86 may be securely fastenable to the device via a threaded engagement between external threads of the device (e.g., threaded collar 110 of a potentiometer, see FIG. 1), and internally-threads 835 of the base 86. While not shown in FIG. 8, it should be understood that alternative bases, for example, having differently-sized internal bores structured to receive differently-sized threaded collars (e.g., of a rotary controller (e.g., potentiometer)) may be utilized in place of base 86.

As shown in FIG. 8, in accordance with aspects of the disclosure, the base 86 includes a circumferential upper surface having a second engagement arrangement 840 configured to interact with the first engagement arrangement 825 to prevent relative rotational movement between the base 86 and the knob 83 when the first engagement arrangement 825 is in contact (e.g., engaged contact) with the second engagement arrangement 840. In embodiments, the first engagement arrangement 825 and the second engagement arrangement 840 each comprise projecting "teeth" (e.g., v-shaped projections and valleys) configured for mutual engagement.

As shown in FIG. 8, the hub 85 includes an upper cylindrical-shaped region 855 (which accommodates the upper axial bore 810) and a lower cylindrical-shaped region 858 having a larger diameter than the upper cylindrical-shaped region 855, and which accommodates the lower axial bore (not shown). In accordance with aspects of the disclosure, the outer diameter of the lower cylindrical-shaped region 858 is approximately the same (e.g., slightly smaller than) the inner diameter of the central bore 815.

As shown in FIG. 8, the exemplary rotary controller locking knob assembly 800 additionally includes a cap 84 that is threadedly engageable with the upper axial bore 810 of the hub 85. The rotary controller locking knob assembly 800 additionally includes a biasing member 87 arranged within the central bore 815 of the knob 83 and outside of the upper cylindrical-shaped region 855. The cap 84 is structured and arranged to maintain the biasing member 87 within the knob 83. In accordance with aspects of the disclosure, with this exemplary embodiment, an upper end of the biasing member 87 is retained in place via contact with the cap 84, and the lower end of the biasing member 87 engages with a circumferential flange surface (not shown) arranged within the central bore 815 of the knob 83, such that the biasing member 87 moves (e.g., compresses or expands) with axial movement of the knob 83 along the hub 85. In embodiments, the biasing member 87 may be a spring, e.g., a coil spring (for example, having a 0.030" diameter).

As such, in accordance with aspects of the disclosure, the biasing member 87 is structured and arranged to bias the first engagement arrangement 825 into contact with the second engagement arrangement 840. As shown in FIG. 8, with this exemplary embodiment, the cap 84 also includes a circumferential flange 845 structured and arranged to maintain the biasing member 87 within the knob (when assembled). The circumferential flange 845 is also structured and arranged to restrict an extent of an upward movement of the knob 83 away from the base 86. Additionally, as shown in FIG. 8, in accordance with aspects of the disclosure, the outer diameter of the circumferential flange 845 is approximately the same (e.g., slightly smaller than) the inner diameter of the central bore 815 of the knob 83 so that with upward movement of the knob 83, the cap 84 is received within the central bore 815.

In accordance with aspects of the disclosure, the knob 83 is axially moveable on the hub 85 to selectively disengage the first engagement arrangement 825 from contact with the second engagement arrangement 840. As such, in accordance with aspects of the disclosure when the first engagement arrangement 825 is in fixed (e.g., engaged) contact with the second engagement arrangement 840, the knob 83 is prevented from rotational actuation so as to prevent unwanted (e.g., unintentional) changes to a rotary controller (e.g., potentiometer) setting. In accordance with further aspects of the disclosure, when the first engagement arrangement 825 is disengaged (i.e., selectively-disengaged) from the second engagement arrangement 840, the knob 83 is able to be rotationally actuated so as to allow desired (e.g., intentional) changes to a rotary controller (e.g., potentiometer) setting.

As shown in FIG. 8, embodiments of the disclosure are directed to a rotary controller locking knob assembly having a base 86 arrangeable around a rotary controller shaft (not shown). The base 86 includes an upper surface having a selectively engageable base locking structure (e.g., the second engagement arrangement 840). A knob 83 is connectable to the rotary controller shaft via the hub 85 and post 81, wherein the knob 83 includes a lower surface having a knob locking structure (e.g., the first engagement arrangement 825), which is structured and arranged to correspondingly engage with the base locking structure (e.g., the second engagement arrangement 840). The rotary controller locking knob assembly 800 includes a biasing member 87 having a biasing direction (e.g. downwardly). The knob 83 is biased with the biasing member 87 relative to the base 86 so that the base locking structure (e.g., the second engagement arrangement 840) is engaged with the knob locking structure (e.g., the first engagement arrangement 825). The knob (e.g., knob 83) is selectively disengageable from the base 86 through moving the knob 633 in a direction opposite to the biasing direction of the biasing member 87 (e.g., upwardly).

As shown in FIG. 8, in some embodiments, an adhesive layer (e.g., a double-sided tape ring 88) may be utilized to securely fasten the base 86 to the device surface (not shown). It should also be understood that the disclosure contemplates other adhesives (e.g., liquid adhesives) may also be utilized to securely fasten the base 86 to the device surface.

As shown in FIG. 8, the radial slot 820 extends in an axial direction 805 of the knob 83. Additionally, in accordance with aspects of the disclosure, in embodiments, the radial slot 820 extends to the base of the knob 83 so as to provide for easier changing of different knobs, and to also improve manufacturability of the knob 83. For example, with this exemplary embodiment, should a user wish to replace the knob 83 with another knob (not shown), a user can remove the cap 84 from threaded engagement with the hub 85, remove the biasing member 87, and slide off the knob 83 (without needing to remove the post 81 or to disconnect the hub 85 from the rotary controller shaft). That is, in accordance with aspects of the disclosure, by utilizing a radial slot 820 that extends to the base of the knob 83 (and in embodiments, utilizing other structures of the knob assembly to limit upward movement of the knob 83 relative to the hub 85 or base 86), the changing of knobs is more easily facilitated.

As shown in FIG. 8, in some contemplated embodiments, the base 86 and the knob 83 have approximately a same outer diameter (e.g., a ½" diameter, with other diameters contemplated by the disclosure).

In embodiments, the knobs 83 may comprise one or more of metal (e.g., aluminum, steel), plastics (e.g., ABS plastic), and composite materials. In embodiments, the hub 85 may comprise one or more of metal, plastics, and composite materials. In embodiments, the base 86 may comprises one or more of metal, plastics, and composite materials.

FIG. 8 also shows a tool 82 (e.g. a hex wrench or screw driver) that may be used to rotate the post 81 (e.g., grub screw), so as to fix the hub 85 to the shaft of a rotary controller. Additionally, as shown in FIG. 8, in embodiments, the cap 84 may include an indicator 860 (e.g., a marking and/or indentation) used to indicate the rotational setting of the rotary controller.

Figure 9:
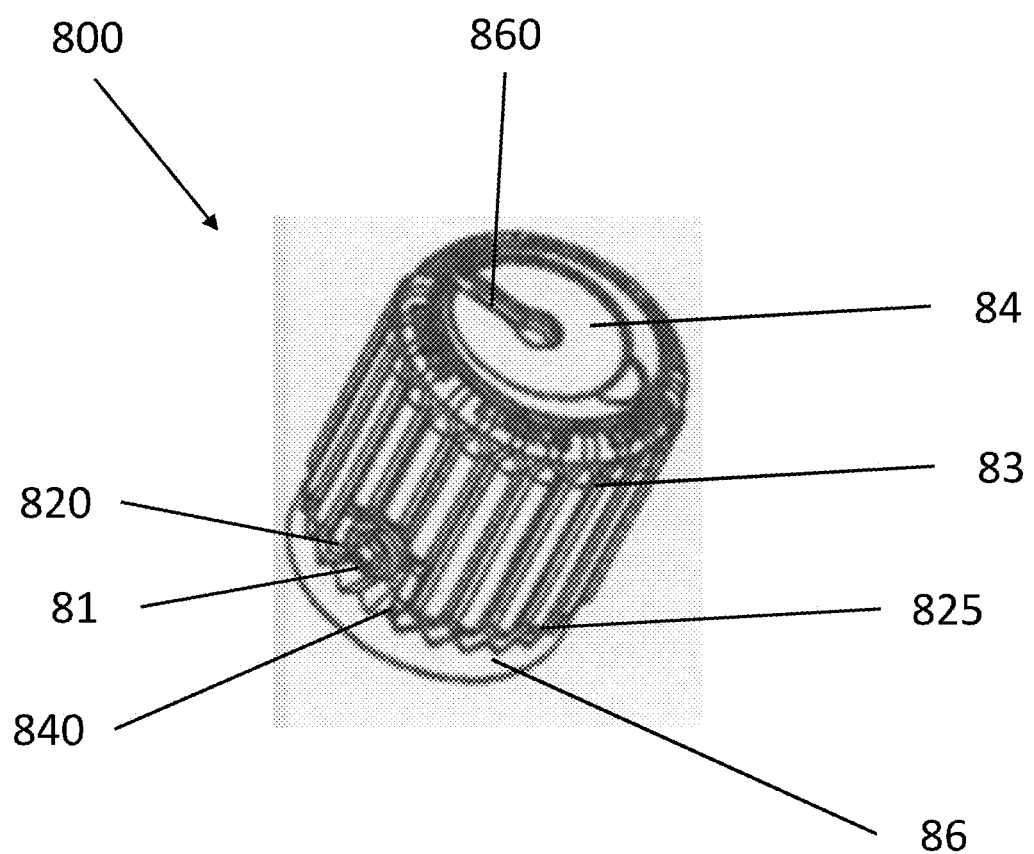
FIG. 9 is an assembled view of an exemplary embodiment of a selectively-disengageable rotary controller locking knob assembly in accordance with aspects of the disclosure.

FIG. 9 shows an assembled view of an exemplary embodiment of a selectively-disengageable rotary controller locking knob assembly 800 in accordance with aspects of the disclosure. As shown in FIG. 9, when assembled and in an engaged state (i.e., the engagement surface 825 of the knob 83 is engaged with engagement surface 840 of the base 86), the selectively-disengageable rotary controller locking knob assembly 900 appears similar (e.g., has a similar size and/or shape) to a conventional knob. As shown in the view of FIG. 9, the knob 83 is concentrically arranged around the hub (not shown) and cover 84, which is viewable through the central bore 815 of the knob 83. As shown in FIG. 9, in accordance with aspects of the disclosure, when the knob 83 is engaged with the base 86, the top surface of the knob 83 is approximately flush with the top surface of the cap 84. The cap includes an indicator 860, which, in embodiments, includes a slot that may be used to receive a device (e.g., screwdriver) for turning the cap 84. While not shown in FIG. 9, when the knob 83 is disengaged from the base 86 by being moved axially upward, the top surface of the knob 83 is raised above the top surface of the cap 84. As additionally shown in FIG. 9, the selectively-disengageable rotary controller locking knob assembly 900 includes the radial slot 820 with the post 81 arranged in the radial slot 820.

Figure 10A:
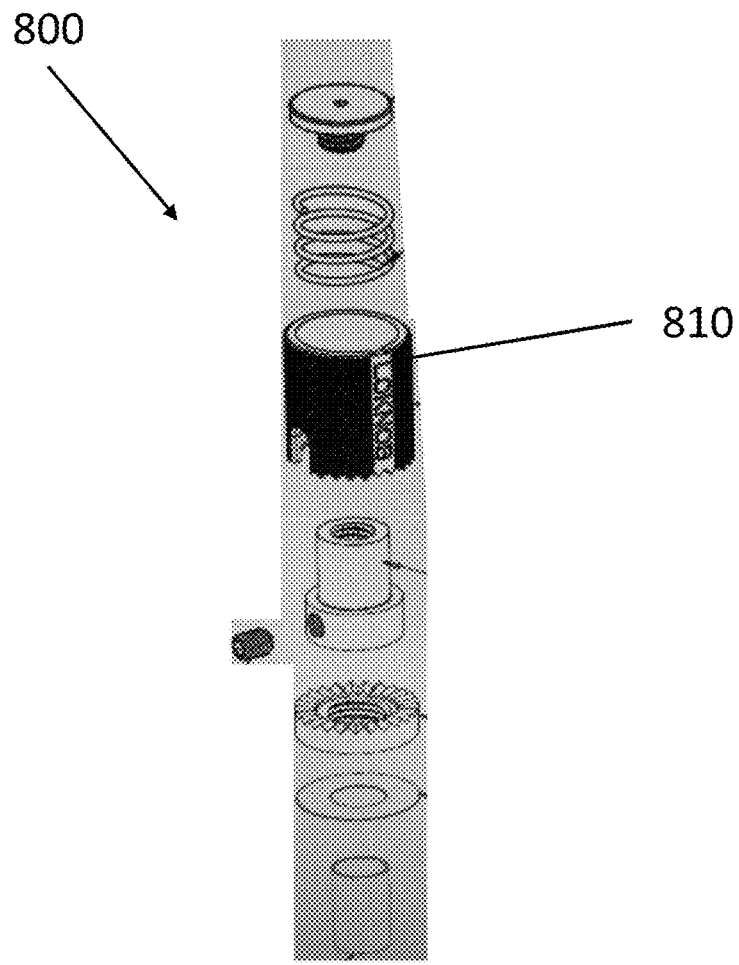
FIG. 10A is an exploded view of an exemplary embodiment of a rotary controller selectively-disengageable locking knob assembly in accordance with aspects of the disclosure.

FIG. 10A is an exploded view of an exemplary embodiment of a rotary controller selectively-disengageable locking knob assembly 800 in accordance with aspects of the disclosure. As shown in FIG. 10A, the selectively-disengageable locking knob assembly 800 includes a different knob 810 of metal (e.g., aluminum, steel, etc.).

Figure 10B:
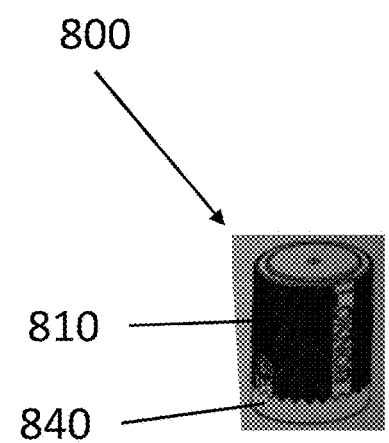
FIG. 10B is an assembled view of an exemplary embodiment of a rotary controller selectively-disengageable locking knob assembly in accordance with aspects of the disclosure.

FIG. 10B is an assembled view of an exemplary embodiment of a rotary controller selectively-disengageable locking knob assembly 800 in accordance with aspects of the disclosure. As shown with the exemplary embodiment of FIG. 10B, with some embodiments, when assembled, the knob 810 and the base 840 have a same outer diameter.

Figure 11:
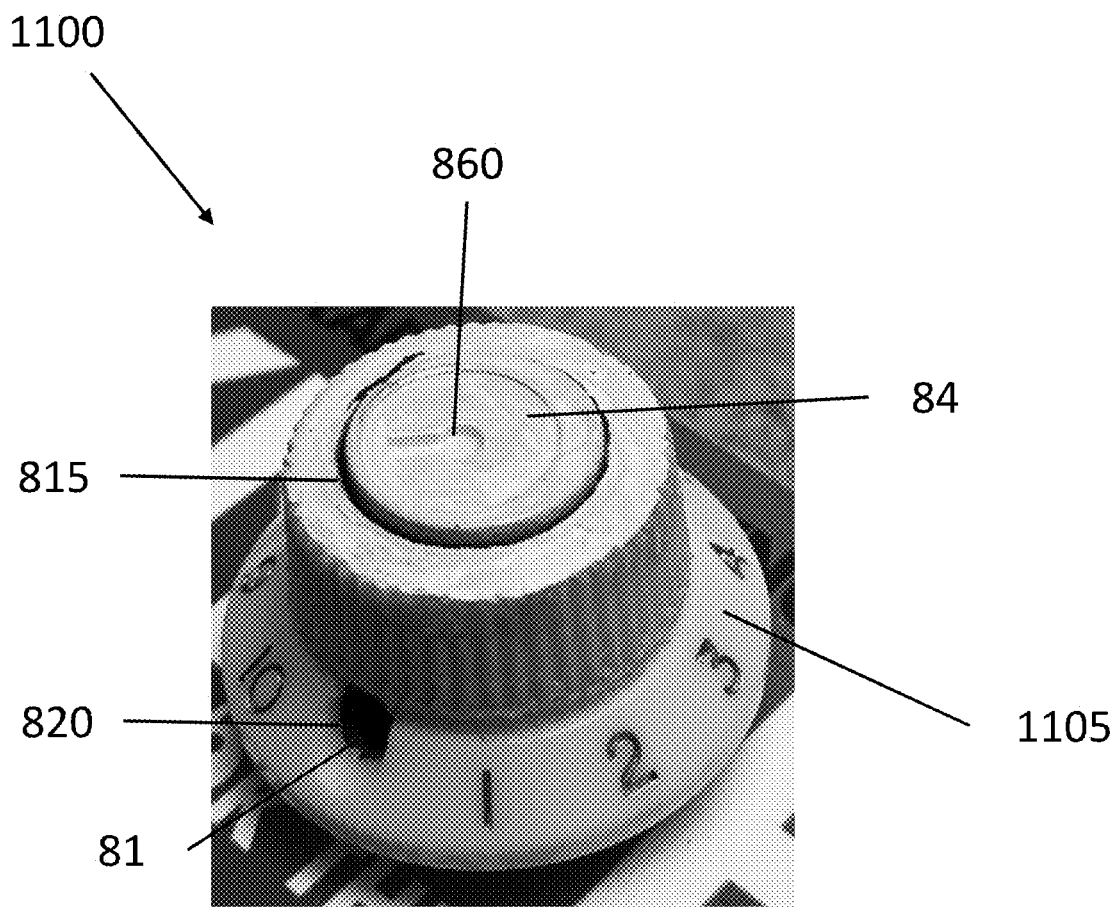
FIG. 11 is a photograph of an exemplary selectively-disengageable rotary controller locking knob assembly in accordance with aspects of the disclosure.

FIG. 11 is a photograph of an exemplary selectively-disengageable rotary controller locking knob assembly 1100 in accordance with aspects of the disclosure. As shown in FIG. 11, the selectively-disengageable rotary controller locking knob assembly 1100 includes a hub (not shown) having a longitudinal axis and an upper axial bore extending at least partially through the hub along the longitudinal axis and a lower axial bore (not shown) extending at least partially through the hub along the longitudinal axis. The upper axial bore is structured to receive a cap 84 and the lower axial bore is configured to receive a shaft (not shown) of a rotary controller arranged in or on a device surface. Additionally, as shown in FIG. 11, in embodiments, the cap 84 may include an indicator 860 (e.g., a marking and/or indentation) used to indicate the rotational setting of the rotary controller.

As shown in FIG. 11, a knob 1105 is concentrically disposed about at least a portion of the hub. The knob 1105 includes at least one central bore 815 structured to receive at least a portion of the hub and the cap 84. The knob 1105 also includes a radial slot 820 alignable with the radial bore. While not viewable in FIG. 11, the knob 1105 includes a circumferential bottom surface (or downward facing surface) having a first engagement arrangement.

A post 81 (e.g., a grub screw or set screw) is threadedly engagable with the radial bore so as to secure the hub to the shaft of the rotary controller (not shown). Additionally, in accordance with aspects of the disclosure, the post 81 is structured and arranged to project radially outwardly through the radial slot 820, such that rotation of the knob 1105 induces a rotation of the hub via contact of the post 81 with the radial slot 820 (e.g., side walls of the radial slot).

Figure 12:
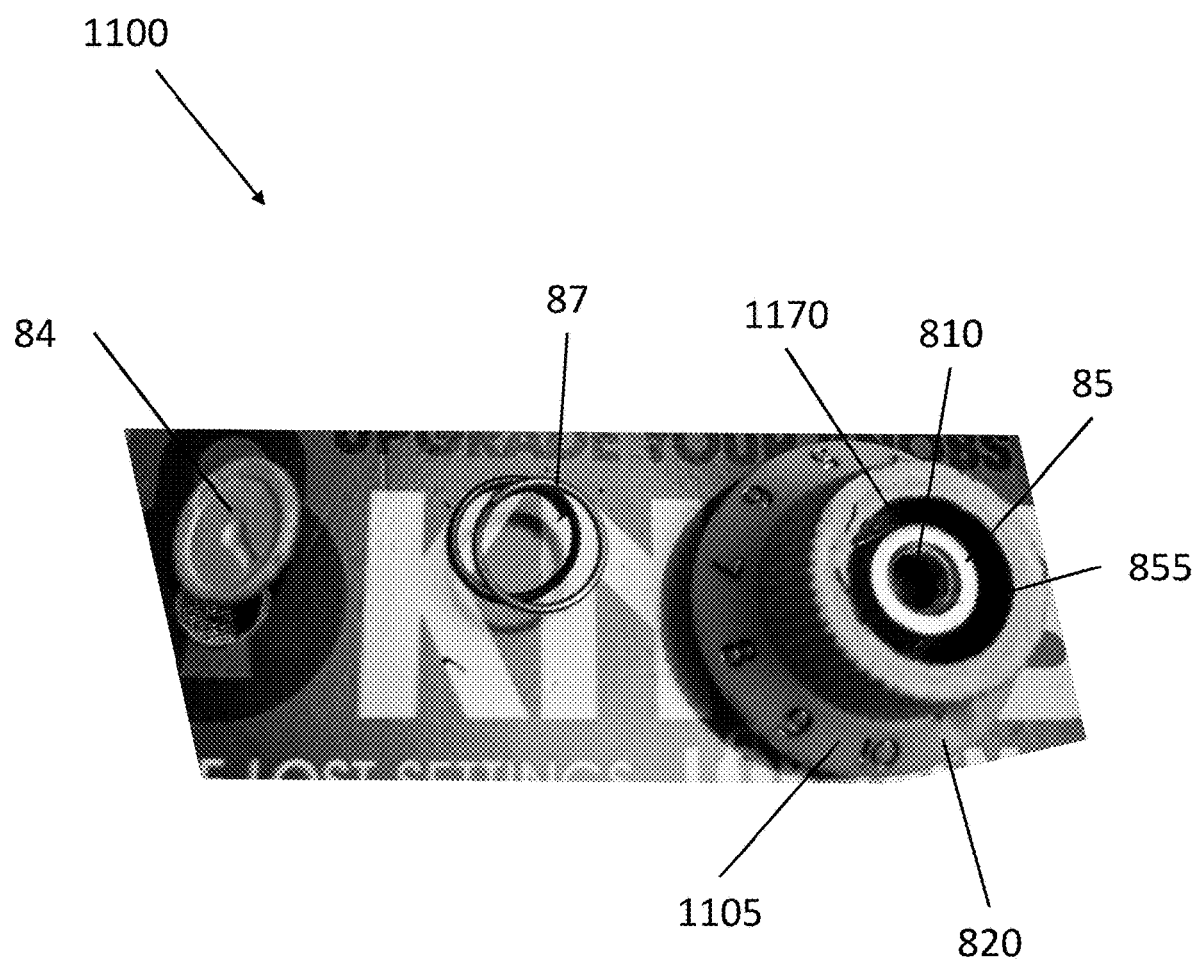
FIG. 12 is a photograph of a partially disassembled exemplary selectively-disengageable rotary controller locking knob assembly in accordance with aspects of the disclosure.
Figure 13:
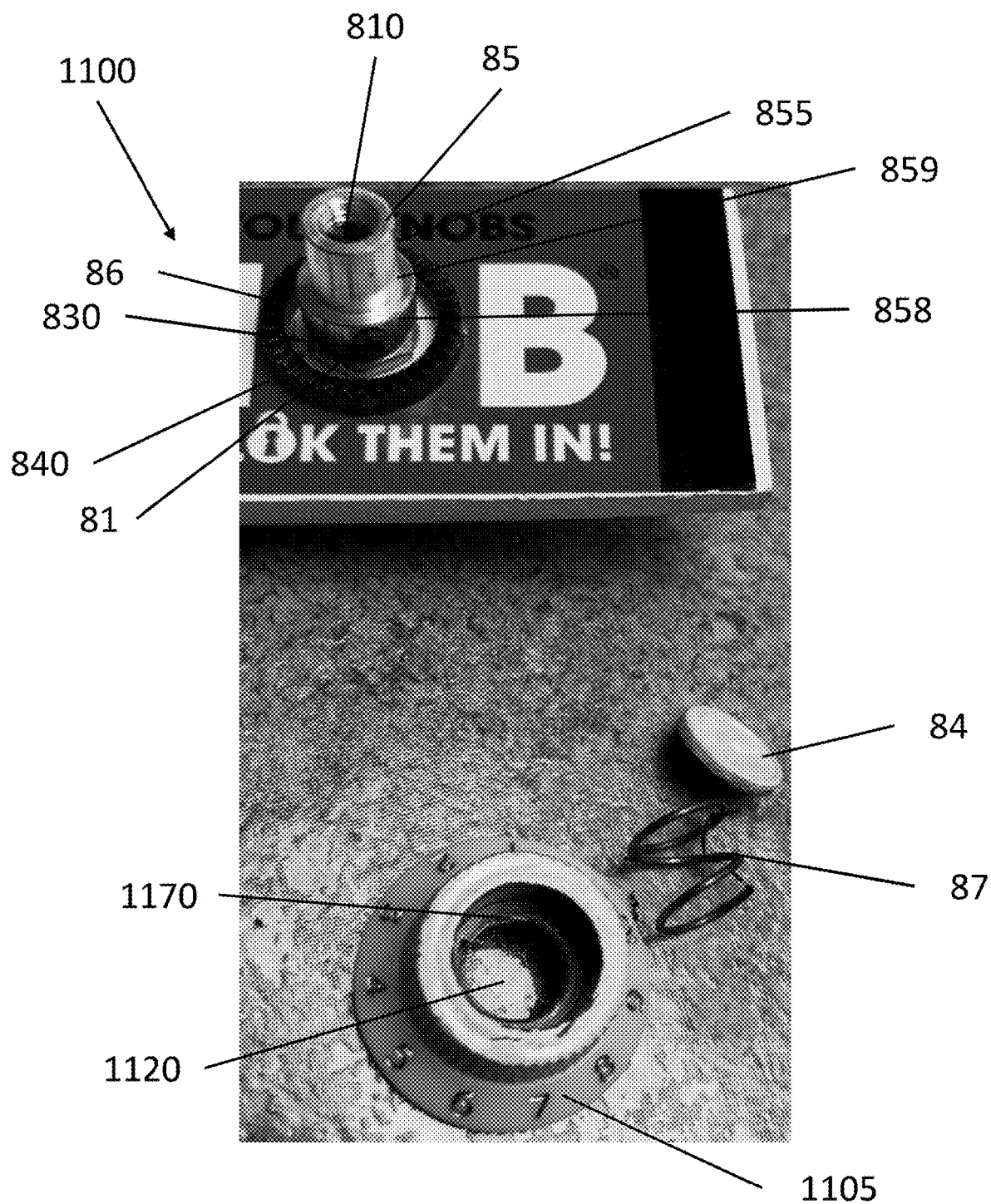
FIG. 13 is a photograph of a partially disassembled exemplary selectively-disengageable rotary controller locking knob assembly in accordance with aspects of the disclosure.

FIG. 12 is a photograph of a partially disassembled exemplary selectively-disengageable rotary controller locking knob assembly 1100 in accordance with aspects of the disclosure. As shown in FIG. 12, the exemplary rotary controller locking knob assembly 800 includes a cap 84 that is threadedly engageable with the upper axial bore 810 of the hub 85. The rotary controller locking knob assembly 1100 additionally includes a biasing member 87 arrangeable within the central bore 815 of the knob 1105 and outside of the upper cylindrical-shaped region 855 of the hub 85. The cap 84 (shown in a removed state) is structured and arranged to maintain the biasing member 87 within the knob 1105 (when assembled). As shown in FIG. 13, the knob 1105 includes a flange surface 1170 structured and arranged to support the lower end of the biasing element 87.

In accordance with aspects of the disclosure, the knob 1105 can be replaced with a different knob (e.g. of a different style, e.g., chicken head, bullet style, straight cylinder) by simply removing the cap 84 and the biasing member 87 (and with some embodiments, after removing the post 81), sliding the knob 1105 off of the hub 85, placing the replacement knob on the hub 85, inserting the biasing member 87 into the upper region of the central bore 815 of the replacement knob and into contact with the flange surface therein, and threading the cap 84 into the upper axial bore 810 of the hub 85. In some embodiments, the radial slot 820 extends in an axial direction 805 of the knob.

FIG. 13 is a photograph of a partially disassembled exemplary selectively-disengageable rotary controller locking knob assembly in accordance with aspects of the disclosure. As shown in FIG. 13, with this exemplary embodiment, should a user wish to replace the knob 1105 with another knob (not shown), a user can remove the cap 84 from threaded engagement with bore 810 the hub 85, remove the biasing member 87, and slide off the knob 1105 (without needing to remove the post 81 from the radial bore 830 or to disconnect the hub 85 from the rotary controller shaft).

As shown in FIG. 13, in embodiments the selectively-disengageable rotary controller locking knob assembly 1100 includes a base 86 securely fastenable to a device surface so as to prevent movement (e.g., rotational movement) of the base 86. For example, in embodiments, the base 86 may be securely fastenable to the device surface via having a lower side of the base 86 attached to a surface of the device via adhesive (e.g., double sided adhesive tape ring, e.g., a coated polyester tape). In further embodiments, the base 86 may be securely fastenable to the device via a threaded engagement between external threads of the device (e.g., threaded collar 110 of a potentiometer, see FIG. 1), and internally-threads (not shown) of the base 86. As shown in FIG. 13, the knob 1105 includes a flange surface 1170 structured and arranged to support the lower end of the biasing element 87.

As shown in FIG. 13, the hub 85 includes an upper cylindrical-shaped region 855 (which accommodates the upper axial bore 810) and a lower cylindrical-shaped region 858 having a larger outer diameter than the upper cylindrical-shaped region 855, and which accommodates the lower axial bore (not shown). Additionally, the hub 85 includes a upper facing surface 859 at the transition from the lower cylindrical-shaped region 858 to the upper cylindrical-shaped region 855. In accordance with aspects of the disclosure, the outer diameter of the lower cylindrical-shaped region 858 is approximately the same (e.g., slightly smaller than) the inner diameter of a lower portion of the central bore 1120 of the knob 1105.

Figure 14:
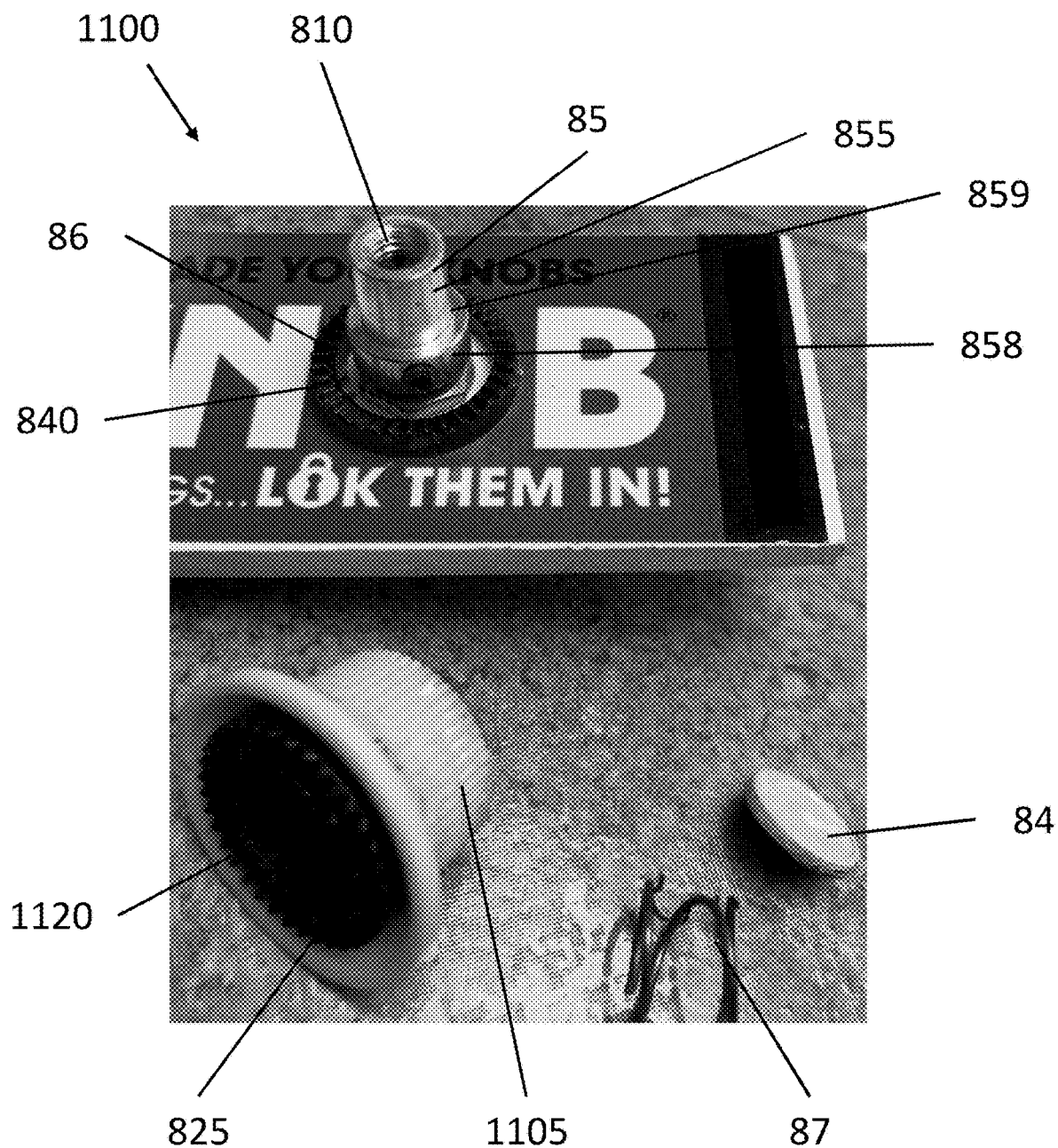
FIG. 14 is a photograph of a partially disassembled exemplary selectively-disengageable rotary controller locking knob assembly in accordance with aspects of the disclosure.

FIG. 14 is a photograph of a partially disassembled exemplary selectively-disengageable rotary controller locking knob assembly 1100 in accordance with aspects of the disclosure. As shown in FIG. 14, in accordance with aspects of the disclosure, the base 86 includes a circumferential upper surface having a second engagement arrangement 840 configured to interact with the first engagement arrangement 825 to prevent relative rotational movement between the base 86 and the knob 1105 when the first engagement arrangement 825 is in contact (e.g., engaged contact) with the second engagement arrangement 840. As shown in FIG. 14, in embodiments, the first engagement arrangement 825 and the second engagement arrangement 840 each comprise projecting "teeth" (e.g., v-shaped projections and valleys) configured for mutual engagement. As further shown in FIG. 14, the knob 1105 includes a lower central bore 1120, in which the hub 85 (e.g., at least the lower cylindrical-shaped region 858 of the hub 85) is accommodated when the knob 1105 is arranged on the hub 85.

Figure 15:
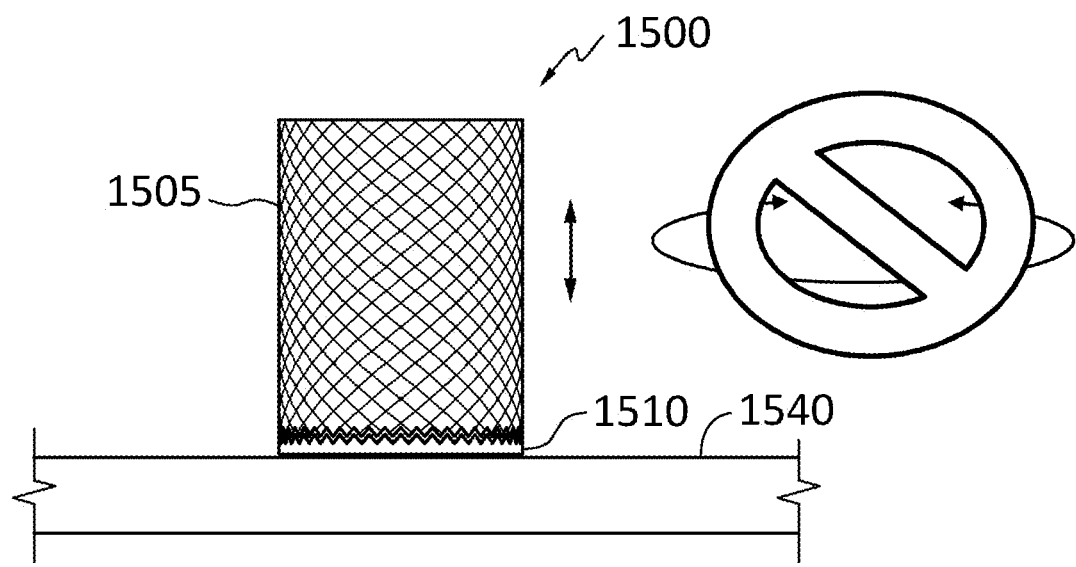
FIG. 15 is a side view of an exemplary embodiment of the disclosure in the locked (un-adjustable) position associated with a housing in accordance with aspects of the disclosure.

FIG. 15 is a side view of an exemplary selectively-disengageable rotary controller locking knob in the locked (un-adjustable) position associated with a housing 1540 in accordance with aspects of the disclosure. As shown in FIG. 15, a control knob 1505 is releasably held relative to the output shaft (not shown) of a control device, and also lockingly but releasably engaged against an object 1540, such as a panel of an audio component or musical instrument containing the control device 1500.

Figure 16:
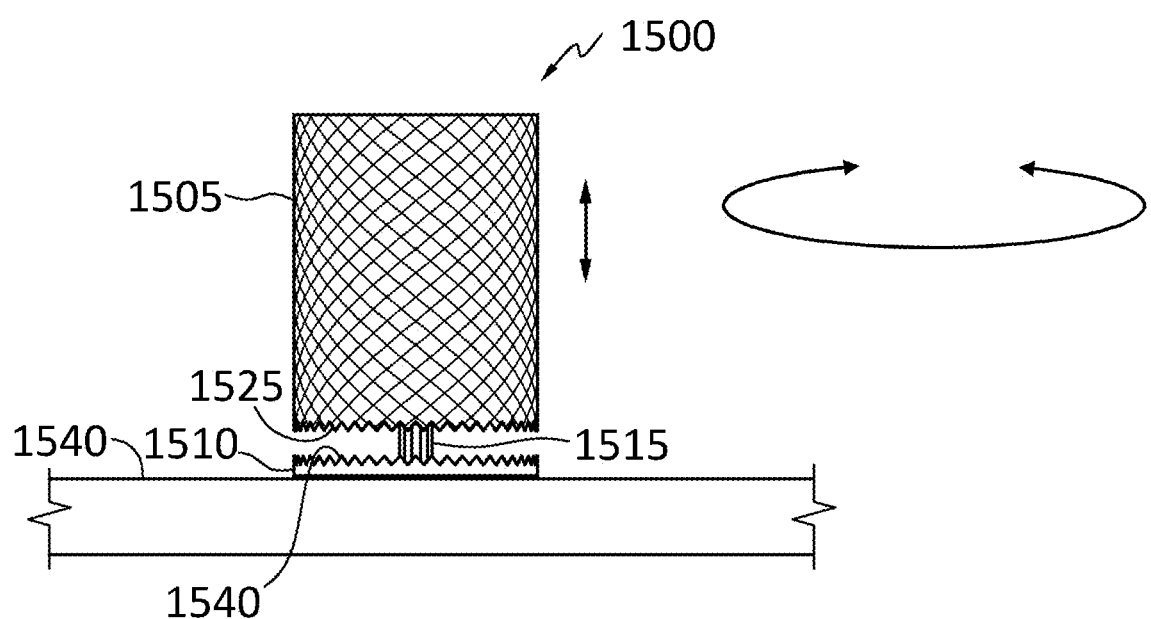
FIG. 16 is a side view of an exemplary embodiment of the disclosure in the unlocked (adjustable) position associated with a housing in accordance with aspects of the disclosure.

FIG. 16 is a side view of an exemplary embodiment of the disclosure in the unlocked (adjustable) position associated with a housing in accordance with aspects of the disclosure. That is, the knob 1505 is shown in a first, locked, position in FIG. 15, and in a second, unlocked, position in FIG. 16. The knob 1505 is placed into the unlocked position (shown in FIG. 16) by pulling upwardly on outer barrel or knob 1505, which causes locking elements 1525 associated with at least a portion of a bottom surface of knob body 1505 to be removed from engagement with corresponding locking elements 1540 associated with a base 1510. The base 1510 is rigidly attached to the object 1540 and/or to the rotary controller (e.g., the potentiometer). When locking elements 1525 and 1540 are disengaged, knob body 1505 can be rotated, which in turn rotates the shaft 1515 of the control device (e.g., potentiometer).

By implementing aspects of the disclosure, inadvertent movement of the rotary controller (e.g., potentiometer) can be prevented via engagement of corresponding locking structures. Additionally, in accordance with additional aspects of the disclosure, in embodiments, the corresponding locking structures can be used to gauge an amount of rotating. For example, by counting the number of clicks (or detents) as the corresponding locking structures move relative to one another, a user can sense (e.g., feel), and thus gauge (or quantify) the amount of rotation. Thus, in accordance with aspects of the disclosure, for example, in situations where the user may have difficulty discerning the position and/or movement of the rotary controller (e.g., on a dark stage or if the user is visually-impaired), the user is still able to move the rotary controller a desired amount in a controlled manner.

Figure 17A:
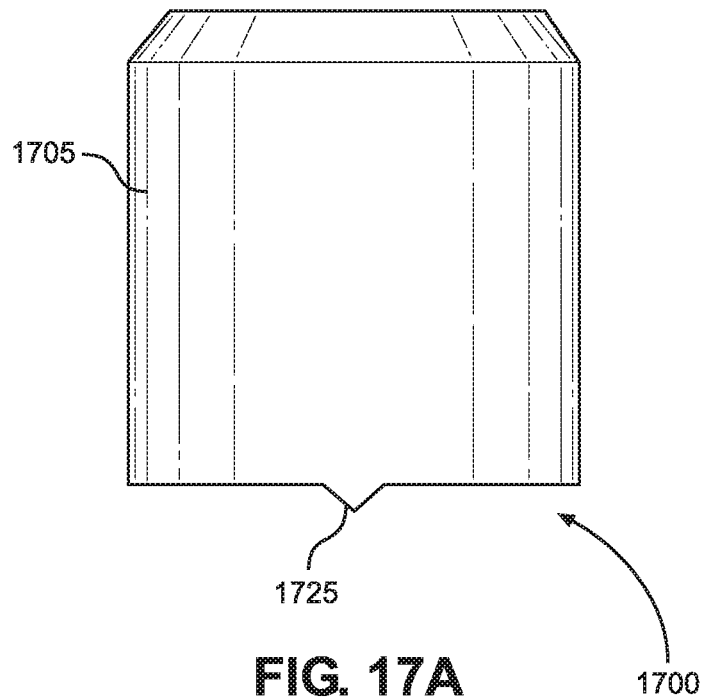
FIG. 17A is a side view of an exemplary knob of an exemplary disengageable rotary controller locking knob assembly in accordance with further aspects of the disclosure.

FIG. 17A is a side view of a schematically-depicted exemplary knob 1705 of an exemplary selectively-disengageable rotary controller locking knob assembly 1700 in accordance with further aspects of the disclosure. As shown in FIG. 17A, with the exemplary and non-limiting embodiment, the knob 1705 includes a lower engagement surface having a single tooth 1725.

Figure 17B:
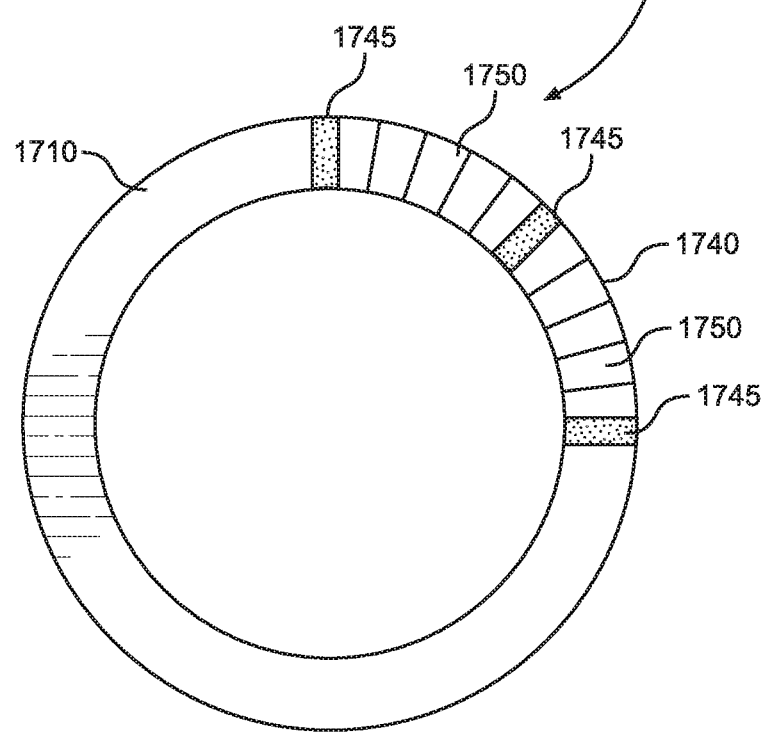
FIG. 17B is a top view of an exemplary ring of an exemplary disengageable rotary controller locking knob assembly in accordance with further aspects of the disclosure.

FIG. 17B is a top view of a schematically-depicted exemplary base (or ring) 1710 of an exemplary selectively-disengageable rotary controller locking knob assembly 1700 in accordance with further aspects of the disclosure. As shown in FIG. 17B, with the exemplary and non-limiting embodiment, the base 1710 includes an upper engagement surface 1740 having one or more deep notches 1745 (for example, at user-preferred setting locations and/or reference setting locations) structured and arranged for engagement with the single tooth 1725. With this exemplary embodiment, the base 1710 includes deep notches 1745 at zero degrees (or twelve o'clock), forty-five degrees, and ninety degrees (or three o'clock), and may include shallower notches 1750 between the deep notches 1745. In accordance with aspects of the disclosure, by utilizing a knob 1705 having a single tooth 1725 in conjunction with a base 1710 having one or more deep notches 1745, a user may move a knob into, e.g., a desired positional setting by "feel" (e.g., without visual confirmation or feedback). For example, with a non-limiting and exemplary embodiment, a ring for a volume controller could be configured with deep notches at "10" (e.g., maximum volume setting, e.g., for lead guitar or solo work) and at "4" (e.g., for ballad volume setting, e.g., for rhythm guitar work). In accordance with aspects of the disclosure, with such an arrangement, a user can easily switch between the different settings by feel, and without requiring the user to see the setting of the knob.

Figure 17C:
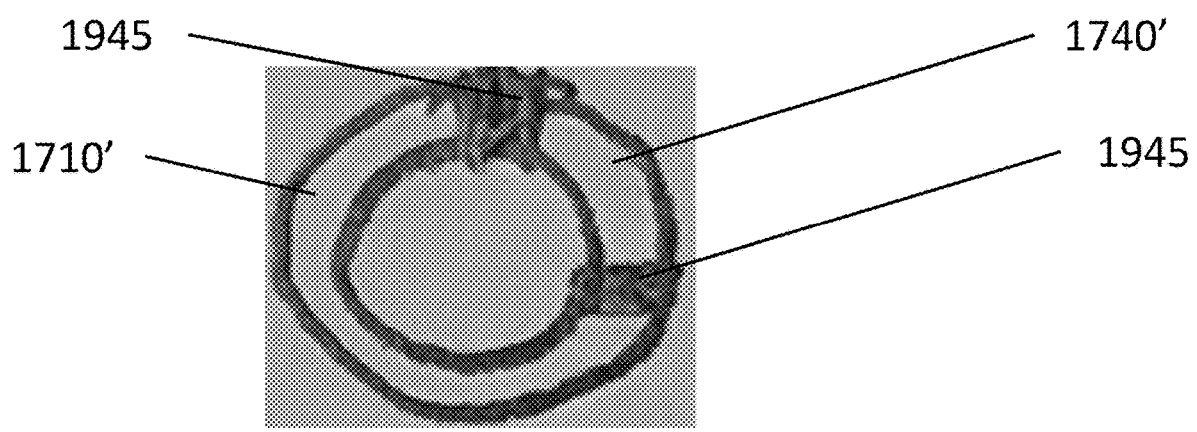
FIG. 17C is a top view of an exemplary ring of an exemplary disengageable rotary controller locking knob assembly in accordance with further aspects of the disclosure.

FIG. 17C is a top view of a schematically-depicted exemplary ring of an exemplary disengageable rotary controller locking knob assembly in accordance with further aspects of the disclosure. As shown in FIG. 17C, with the exemplary and non-limiting embodiment, the base 1710' includes an upper engagement surface 1740' having one or more deep notches 1745 (for example, at user-preferred setting locations and/or reference setting locations) structured and arranged for engagement with the single tooth 1725. With this exemplary embodiment, the base 1710' includes deep notches 1745 at twelve o'clock and three o'clock. It should be understood that the disclosure contemplates an upper engagement surface may be configured with one or more deep notches at locations desired by a user for a particular application.

FIGS. 18A-18D schematically depict views of exemplary interchangeable knobs (or "vari"-bodies) of an exemplary selectively-disengageable rotary controller locking knob assembly in accordance with further aspects of the disclosure. As noted above, in accordance with aspects of the disclosure, various knobs (e.g., having different styles, colors, materials), for example, the Stratocaster-style knob as schematically depicted in FIG. 18B, the chicken-head style knob as schematically depicted in FIG. 18C, and/or the bullet-style knob as schematically depicted in FIG. 18D, may easily be interchanged with the current knob and assembled with (or attached to) the remaining components of the selectively-disengageable rotary controller locking knob assembly, as schematically depicted in FIG. 18A. In other contemplated embodiments, in accordance with aspects of the disclosure, the rings (or bases) may also be interchanged when interchanging a particular knob.

Additional aspects of the disclosure are directed to a rotary controller selectively-disengageable locking knob assembly retrofit kit for a rotary controller assembly. In an exemplary embodiment, the retrofit kit includes a rotary controller selectively-disengageable locking knob assembly, and a set of instructions for attaching the selectively-disengageable locking knob assembly to the rotary controller, the set of instructions comprising: removing a knob attached to the shaft of the rotary controller; attaching the base to the device surface, attaching the hub of the selectively-disengageable locking knob assembly to the shaft of the rotary controller, attaching the knob to the hub; and arranging the biasing element in the knob, wherein the biasing element is arranged between the hub and the knob in a radial direction.

A method of releasably locking adjustability of a rotary controller includes attaching the selectively-disengageable locking knob assembly to the rotary controller, wherein, when attached to the rotary controller, the selectively-disengageable locking knob assembly is operable to prevent rotation of the rotary controller when the first engagement arrangement is engaged with the second engagement arrangement.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

In the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Accordingly, the novel configuration is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

While the disclosure refers to specific embodiments, those skilled in the art will understand that various changes may be made and equivalents may be substituted for elements thereof without departing from the true spirit and scope of the embodiments of the disclosure. For example, as noted above, while aspects of the disclosure are described with reference to a potentiometer, it should be understood that aspects of the disclosure may be used with other rotary controllers (e.g., rotary encoders). While exemplary embodiments are described above, it is not intended that these embodiments describe all possible forms of the invention. Rather, the words used in the specification are words of description rather than limitation, and it is understood that various changes may be made without departing from the spirit and scope of the disclosure. In addition, modifications may be made without departing from the essential teachings of the disclosure. Furthermore, the features of various implementing embodiments may be combined to form further embodiments of the disclosure.

In addition, the structures shown herein are described in use with the adjustment shaft of a control device, such as a typical adjustable potentiometer. It is to be understood, however, that the embodiments disclosed herein are suitable for use with any adjustable rotary control member such as the type having a rotary output shaft mounted or extending through a panel of an object, such as, but not by way of limitation, a body of a musical instrument, amplifier or other audio control component.

What is claimed is:

1. A rotary controller selectively-disengageable locking knob assembly, comprising:
    a hub having a longitudinal axis and an axial bore extending at least partially through the inner hub along the longitudinal axis, wherein the axial bore is configured to receive a shaft of a rotary controller arranged in or on a device surface;
    the hub including a radial bore extending from an outer surface of the hub to the axial bore, wherein the radial bore is perpendicular to the axial bore;
    a knob concentrically disposed about at least a portion of the hub, wherein the knob includes:
        at least one central bore structured to receive at least a portion of the hub;
        a radial slot alignable with the radial bore; and
        a circumferential bottom surface having a first engagement arrangement;
    a post threadedly engaged with the radial bore so as to secure the hub to the shaft of the rotary controller, and projecting radially outwardly through the radial slot, such that rotation of the knob induces a rotation of the hub via contact of the post with the radial slot;
    a base having a lower side securely fastenable to the device surface and a circumferential upper surface having a second engagement arrangement configured to interact with the first engagement arrangement to prevent relative rotational movement between the base and the knob when the first engagement arrangement is in contact with the second engagement arrangement; and
    a biasing member arranged within the knob and structured and arranged to bias the first engagement arrangement into contact with the second engagement arrangement,
    wherein the knob is axially moveable on the hub to selectively disengage the first engagement arrangement from contact with the second engagement arrangement, and
    wherein the radial slot extends to the circumferential bottom surface of the knob.

2. The rotary controller selectively-disengageable locking knob assembly of claim 1, further comprising an adhesive layer structured and arranged to securely fasten the base to the device surface.

3. The rotary controller selectively-disengageable locking knob assembly of claim 1, further comprising a cap threadedly-engageable with the hub, wherein the cap is structured and arranged to maintain the biasing member within the knob.

4. The rotary controller selectively-disengageable locking knob assembly of claim 3, wherein the cap is structured and arranged to restrict an extent of an upward movement of the knob away from the base.

5. The rotary controller selectively-disengageable locking knob assembly of claim 1, wherein the hub includes a circumferential flange structured and arranged to maintain the biasing member within the knob.

6. The rotary controller selectively-disengageable locking knob assembly of claim 5, wherein the circumferential flange is structured and arranged to restrict an extent of an upward movement of the knob away from the base.

7. The rotary controller selectively-disengageable locking knob assembly of claim 1, wherein the biasing member comprises a spring.

8. The rotary controller selectively-disengageable locking knob assembly of claim 1, wherein the radial slot extends in an axial direction of the knob.

9. The rotary controller selectively-disengageable locking knob assembly of claim 1, wherein the first engagement arrangement and the second engagement arrangement each comprise projecting teeth.

10. The rotary controller selectively-disengageable locking knob assembly of claim 1, wherein the base and the knob have approximately a same outer diameter.

11. The rotary controller selectively-disengageable locking knob assembly of claim 1, wherein the hub comprises a cylindrical shape.

12. The rotary controller selectively-disengageable locking knob assembly of claim 1, wherein the knob comprises one or more of metal, plastics, and composite materials.

13. The rotary controller selectively-disengageable locking knob assembly of claim 1, wherein the rotary controller is a potentiometer.

14. The rotary controller selectively-disengageable locking knob assembly of claim 1, wherein the rotary controller is a rotary encoder.

15. The rotary controller selectively-disengageable locking knob assembly of claim 1, wherein the base comprises a threaded inner bore structured and arranged to threadedly engage with a threaded collar of the rotary controller.

16. The rotary controller selectively-disengageable locking knob assembly of claim 1, wherein the first engagement arrangement comprises a single tooth and the second engagement arrangement comprises a plurality of deep notches.

17. A rotary controller selectively-disengageable locking knob assembly retrofit kit for a rotary controller assembly, comprising the rotary controller selectively-disengageable locking knob assembly of claim 1, and
    a set of instructions for attaching the selectively-disengageable locking knob assembly to the rotary controller, the set of instructions comprising:
        removing a knob attached to the shaft of the rotary controller;
        attaching the base to the device surface;

attaching the hub of the selectively-disengageable locking knob assembly to the shaft of the rotary controller;

attaching the knob to the hub; and arranging the biasing element in the knob,
wherein the biasing element is arranged between the hub and the knob in a radial direction.

18. The rotary controller selectively-disengageable locking knob assembly retrofit kit for a rotary controller assembly according to claim 17, wherein the set of instructions additionally comprise attaching the cap to the hub, wherein the biasing element is arranged between the hub and the cap in an axial direction.

19. A method of releasably locking adjustability of a rotary controller, the method comprising:

attaching the selectively-disengageable locking knob assembly of claim 1 to the rotary controller, wherein, when attached to the rotary controller, the selectively-disengageable locking knob assembly is operable to prevent rotation of the rotary controller when the first engagement arrangement is engaged with the second engagement arrangement.

20. A rotary controller assembly, comprising:

a rotary controller having a shaft; and the selectively-disengageable locking knob assembly of claim 1 arranged on the rotary controller.

21. The rotary controller assembly of claim 20, wherein the rotary controller is a potentiometer.

22. The rotary controller assembly of claim 20, wherein the rotary controller is a rotary encoder.

23. A rotary controller locking knob assembly, comprising:

a base arrangeable around a rotary controller shaft, wherein the base includes an upper surface having a selectively engageable base locking structure;

a knob connectable to the rotary controller shaft, wherein the knob actuator includes a lower surface having a knob locking structure, which is structured and arranged to correspondingly engage with the base locking structure; and a biasing member having a biasing direction;

wherein the knob is biased with the biasing member relative to the base so that the base locking structure is engaged with the knob locking structure, wherein the knob is selectively disengageable from the base through moving the knob in a direction opposite to the biasing direction of the biasing member, wherein the knob includes a radial slot that extends to the lower surface of the knob.

* * * * *